United States Patent [19]

Nishida et al.

[11] Patent Number: 5,479,382
[45] Date of Patent: Dec. 26, 1995

[54] INFORMATION RECORDING MEDIUM COMPRISING RECORDING LAYER CAPABLE OF RECORDING UNDER-EXPOSURE TO RECORDING LASER BEAM

[75] Inventors: Tetsuya Nishida, Nakano; Motoyasu Terao, Nishitama; Shinkichi Horigome, Tachikawa, all of Japan

[73] Assignees: Hitachi, Ltd.; Hitachi Maxell, Ltd., both of Tokyo, Japan

[21] Appl. No.: 293,275

[22] Filed: Aug. 19, 1994

[30] Foreign Application Priority Data

Aug. 23, 1993 [JP] Japan .................................. 5-207374

[51] Int. Cl.$^6$ .................................. G11B 13/04
[52] U.S. Cl. .................. 369/13; 428/694 ML; 369/275.2; 369/275.1
[58] Field of Search ................ 369/13, 284, 14, 369/272, 275.1, 275.4, 275.2, 275.3; 428/694 R, 694 ML, 694 SC; 430/945

[56] References Cited

U.S. PATENT DOCUMENTS

| 5,090,009 | 2/1992 | Hamada et al. | 369/275.4 |
| 5,274,624 | 12/1993 | Yamada et al. | 369/275.1 |
| 5,325,353 | 6/1994 | Sasaki et al. | 369/275.1 |
| 5,339,306 | 8/1994 | Yoshinaga et al. | 369/275.1 |

FOREIGN PATENT DOCUMENTS

| 47-26897 | 7/1972 | Japan . |
| 54-41902 | 12/1979 | Japan . |
| 57-24039 | 2/1982 | Japan . |
| 61-188752 | 8/1986 | Japan . |
| 2-87339 | 3/1990 | Japan . |
| 2-87342 | 3/1990 | Japan . |
| 2-87340 | 3/1990 | Japan . |

*Primary Examiner*—Georgia Y. Epps
*Assistant Examiner*—Tan Dinh
*Attorney, Agent, or Firm*—Pennie & Edmonds

[57] ABSTRACT

An information recording medium has a thin-film recording layer and a reflective layer that reflects a laser beam. The recording layer can be composed of an inorganic substance whose optical constant changes when exposed to a laser beam due to the change of its atomic arrangement. The recording layer can also be of an organic substance that deforms when exposed to a laser beam. The medium reflectivity, with respect to the reproduction laser beam exposure from the substrate side, is at least 65 percent on either of the recorded and unrecorded marks, and not more than 45 percent from the other of the recorded and unrecorded marks. In addition, the reflective-layer reflectivity, with respect to the reproduction laser beam, is at least 85 percent. The information recording medium additionally features excellent recording, erasing, and reproduction characteristics, with low recording power and high recording sensitivity during recording, and can even be read by a CD drive or the like.

31 Claims, 3 Drawing Sheets

INFORMATION RECORDING MEDIUM COMPRISING RECORDING LAYER CAPABLE OF RECORDING UNDER-EXPOSURE TO RECORDING LASER BEAM

BACKGROUND OF THE INVENTION

The present invention relates to the information recording medium with particular reference to the information recording medium, with its the recording layer made up of the inorganic thin film whose optical properties are modified by the change of atomic arrangement or organic thin film which undergoes deformation, when exposed to laser beam.

When the information recording medium whose optical properties are modified by the change of atomic arrangement under laser beam is exposed to laser beam for recording, the recording layer undergoes phase change, atomic diffusion and photodarkening, resulting in change of reflectivity with respect to laser beam for reproducing; therefore, allowing information to be recorded.

The prior technique regarding phase change of the recording layer, for example, in the Japanese Patent Publication 47-26897 discloses such thin films as the Te-Ge system, As-Te-Ge system and Te-O system. The Japanese Patent Publication 54-41902 discusses the compositions of $(Ge)_{20}(T1)_5(Sb)_5(Se)_{70}$. Furthermore, Japanese Patent Laid-Open 57-24039 describes the thin films of $(Sb)_{25} (Te)_{12.5} (Se)_{62.5}$, $(Cd)_{14} (Te)_{14} (Se)_{72}$, $(Bi)_2 (Se)_3$, $(Sb)_2 (Se)_3$, $(In)_{20} (Te)20(Se)_{60}$, $(Bi)_{25} (Te)_{12.5} (Se)_{62.5}$, CuSe and $(Te)_{33}(Se)_{67}$.

Moreover, the prior art on the atomic diffusion of recording layer, for example, in Japanese Patent Laid-Open 61-188752 discusses the two-layer film of $(Sb)_2 (Se)_3/Bi$.

Furthermore, the information recording medium with the recording layer composed of the organic thin film which is deformed by exposure to laser beam is disclosed in the Japanese Patent Laid-pen 2-87339, Japanese Patent Laid-Open 2-87340 and Japanese Patent Laid-Open 2-87342.

In the information recording medium having a recording layer composed of the inorganic thin film whose optical properties are modified due to change in atomic arrangement when exposed to laser beam, the higher reflectivity to laser beam at the unrecorded mark or recorded mark has been conventionally set below 65 percent.

The resistivity below 65 percent, however, has been faced with the problem that direct reading of the information is not possible for the read-only CD drive, CD-ROM drive, CD-I (CD-Interactive) drive, laser disk drive and similar devices which assume the use of information recording medium having a high reflectivity.

To solve this problem, it is possible to consider increase the reflectivity to 65 percent or more at the unrecorded mark and recorded mark. But since composition to ensure higher reflectivity has not been optimized in this type of information recording medium, this method has been confronted with the problem that reproduced signal intensity is insufficient when information is recorded.

Furthermore, in the information recording medium having a recording layer composed of the organic thin film whose optical properties are modified due to change in atomic arrangement when exposed to laser beam, Au, Al, or Au and Ag—metals having a high reflectivity of 85 percent or more with respect to the laser beam irradiated for reproduction—have been used as the reflective film materials in order to increase the reflectivity of the medium. These metals have an electrical resistivity of 3.5 $\mu\Omega \cdot cm$ or less at 298K; therefore, the thermal conductivity is as large as 210 W/m·K or more, and heat is quickly removed from the portion exposed to laser beam for recording, resulting in reduced recording sensitivity. This has been accompanied by the disadvantage that the high-output type expensive as laser beam for recording has to be used.

SUMMARY OF THE INVENTION

An object of the present invention is to solve the said problems and to provide an information recording medium having a recording layer composed of the inorganic thin film whose optical properties are modified due to change in atomic arrangement when exposed to laser beam, or the organic thin film subjected to deformation;—an information recording medium which ensures that information can be read directly by the read-only CD drive and similar devices by increase of the reflectivity to 65 percent or more at the unrecorded mark and recorded mark, and which ensures sufficient reproduced signal intensity when information is recorded, by optimization of the composition.

Another object of the present invention is to provide an information recording medium having a recording layer composed of the inorganic thin film whose optical properties are modified due to change in atomic arrangement when exposed to laser beam, or the organic thin film subjected to deformation;—an information recording medium which is capable of using the less expensive low-output laser beam for recording, by reducing the recording power when the data is recorded and by improving the recording sensitivity, despite a high reflectivity of 65 percent or more with respect to the laser beam for reproduction at the unrecorded mark and recorded mark.

As the first object, the present invention provides a information recording medium comprising at least a substrate, a recording layer deposited on the substrate directly or through the protective layer and made up of the inorganic substance whose optical constant is changed due to the change of atomic arrangement occurring virtually without being deformed when exposed to deposited laser beam, a intermediate layer deposited on said recording layer, a reflective layer deposited on said intermediate layer to reflect said laser beam and a the capping layer (i.e. the protective layer over the reflective layer) deposited on said reflective layer;—the information recording medium characterized in that the reflectivity with respect to laser beam from the substrate is 65 percent or more on either of the unrecorded mark or recorded mark and is 45 percent or less on the other, while the film thickness of the reflective layer is 15 to 25 nm inclusive.

In said composition, the recording layer should undergo changes between the amorphous state and crystalline state; crystalline state intermingled in the amorphous state is also acceptable. In addition to the layer which undergoes changes between the amorphous state and crystalline state, the layers changing in crystal grain sizes and crystal systems, and those changing between the crystal state and metastable state are also acceptable. Furthermore, part of the atoms in the recording layer may be migrated by diffusion and chemical reaction. Both said phase change and atomic migration are allowed to occur.

In said composition, even initial reflectivity of below 65 percent can be included in the scope of the present invention if the reflectivity is made to be 65 percent or more by exposure to Ar laser beam, semiconductor laser beam or by initial crystallization due to flash annealing.

In said composition, deposition should preferably be in the order of the recording layer, intermediate layer, reflective layer and capping layer, as counted form the position closest to the substrate.

In said composition, it is preferred that the recording layer, intermediate layer, reflective layer and capping layer be adjacent to one another.

Assume that the recording layer, intermediate layer, reflective layer and capping layer are combined to form a information recording carrier; the environment resistance will be improved if one side of the information recording carrier is protected in close contact by the protective layer. If both sides of the information recording carrier are protected in close contact by the protective layer, the environment resistance will be further improved, and the number of rewriting will be improved 10 times or more when used a reversible carrier.

In said composition, it is preferred that the recording layer have a film thickness of 50 to 120 nm inclusive.

In said composition, it is preferred that the extinction coefficient, the imaginary part of complex refractive index with respect to laser beam, be 0.2 or less in either of the unrecorded mark or recorded mark of the recording layer (i.e. a mark having higher resistivity). Extinction coefficient exceeding 0.2 will cause the medium reflectivity to be below 65 percent; this is not preferable.

In said composition, it is preferred that the recording layer contain at least one of the elements Se and S.

In said composition, it is preferred that the content of Se or S be 40 at. percent to 90 at. percent inclusive.

In said composition, it is preferred that the recording layer contain at least one of the elements Se and S, and at least one element selected from the groups consisting of In, Sn, Te, Bi, Si, Pb and Ga.

In said composition, it is preferred that the recording layer contain Se and In and at least one element selected from the group consisting of Sn, Te, Bi, Si, Pb, Ga, Sb and Ge.

In the medium having said composition, it is preferred that the recording layer contain at least one element of Se and S, and at least one element selected from the group consisting of Tl, Co, Ti. V, Cr, Mn, Fe, Ni, Cu, Pd, Ag and Au.

In said composition, it is preferred that the content of Tl or Co be 2 at. percent to 10 at. percent inclusive.

In said composition, it is preferred that the extinction coefficient at the imaginary part of complex refractive index with respect to laser beam of the intermediate layer, be 0.2 or less.

The reflective layer is preferred if the thermal conductivity is increased using Au, Ag, Cu, Al, Au alloy, Ag alloy, Cu alloy and Al alloy, because this helps prevent film deformation due to excessive temperature rise.

In the structure mentioned above, it is preferred that the thickness of the capping layer is 20 nm to 500 nm inclusive.

In mass production of the information recording media according to the present invention partly having the same information, it is preferred that the read-only information (ROM) be formed in a concave or convex prepit on part of the information recording medium in advance, so that ROMs and RAMs be coexistent.

The information recording medium according to the present invention can be used in the form of tapes and cards. It permits a real-time recording of frequency-modulated analog signals such as video and audio signals, as well as digital information signals such as electronic computer data, facsimile signals and digital audio signals.

The information recording medium according to the present invention comprises at least a substrate, a recording layer made up of the inorganic substance whose optical constant is changed due to the change of atomic arrangement occurring when exposed to deposited laser beam, a intermediate layer, the reflective layer, and a the capping layer— the information recording medium characterized in that the reflectivity with respect to laser beam from the substrate is 65 percent or more on either of the unrecorded mark or recorded mark and is 45 percent or less on the other, while the film thickness of the reflective layer is 15 to 25 nm inclusive.

Provision of such a high reflectivity permits the information to be read directly by the read-only CD drive and similar device. Especially when the initial reflectivity on the unrecorded mark is 70 percent or more, and the reflectivity on the recorded mark is 28 percent or less, the product ensures complete conformity to the Orange Book Part II, a standard for CD-WO (write once CD).

On the other hand, the film thickness of the reflective layer is designed to be 15 to 25 nm inclusive; this feature allows recording at with sufficient sensitivity at the power without damaging the recording layer, providing a sufficient reproduced signal intensity.

As the second object, the information recording medium according to the present invention provides a information recording medium comprising at least a recording layer which is formed directly on the substrate or through the protective layer composing of at least one of the inorganic and organic substances and which records the information by exposure to recording laser beam, and a reflective layer to reflect said laser beam—the information recording medium characterized in that the reflectivity with respect to laser beam from the substrate is 65 percent or more on the unrecorded mark and 45 percent or less on recorded mark, or 45 percent or less on the unrecorded mark and 65 percent or more on recorded mark, said reflective layer having a high reflectivity of 85 percent or more with respect to the laser beam for reproduction, and having an electrical resistivity of 7 $\mu\Omega$·cm or more at 298K.

The average composition of said reflective layer in the direction of the film thickness can be expressed by the general formula $(Au)_{100-x} (A)_x$ (where x is $0.5 \leq x \leq 15$ in terms of atomic percentage, and the element presented by "A" is assumed to be at least one element of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb and Bi), or by the general formula $(Au)_{100-y} (D)_y$ (where y is $15 \leq y \leq 85$ in terms of atomic percentage, and the element presented by "D" is assumed to be at least one element of Ag and Cu).

The recording layer to record information under exposure to the laser beam for recording can use the substance which is deformed by exposure to the laser beam for recording. In this case, the medium is composed in the order of the substrate, recording layer and reflective layer, with formation starting from the substrate. This is particularly effective for the substance deformed by exposure to the laser beam for recording, —the substance which is mainly composed of the organic dye. Dyes that can be used include phthalocyanine dye, polymethine dye, naphtoquinone dye, rhodamine dye, cyanine dye, azurhenium dye, large-ring azaannulene dye, and naphtoquinone based dye.

Said recording layer to record information under exposure to the laser beam for recording can use the inorganic substance whose optical constant is modified by change in atomic arrangement taking place without deformation under exposure to the laser beam for recording. It is particularly effective for the case where the medium is formed in the order of the substrate, lower dielectric protective layer, recording layer, upper dielectric protective layer and reflective layer, with the formation starting from the substrate, and said recording layer contain at least one of the elements Se and Te, or the case where the medium is formed in the order of the substrate, lower reflective layer, lower dielectric protective layer, recording layer, upper dielectric protective layer and upper reflective layer, with the formation starting from the substrate, and said recording layer contain at least one of the elements Se and Te.

In mass production of the information recording media according to the present invention partly having the same information, assume that the read-only memory (ROM) is formed in a concave or convex prepit on part of the information recording medium according to the present invention in advance so that they are coexistent.

Said reflective layer has a high reflectivity of 85 percent or more with respect to the laser beam for reproduction, so the wavelength of the laser beam for reproduction used for the information recording medium according to the present invention is considered to be 600 to 900 nm inclusive. To design the optical head in the recording and reproducing device in a compact configuration, the laser beam for recording and reproduction is assumed as semi-conductor laser beam having a wavelength of 600 to 900 nm inclusive.

Different semi-conductor laser may be used for said laser beam for recording and laser beam for reproduction. To ensure that the optical head has a simple structure and can be manufactured at a low cost, however, said laser beam for recording and that for reproduction is assumed as the same semi-conductor laser beam.

The information recording medium according to the present invention has a reflectivity with respect to laser beam from the substrate registering 65 percent or more on the unrecorded mark and 45 percent or less on recorded mark, or 45 percent or less on the unrecorded mark and 65 percent or more on recorded mark. It is composed of at least a recording layer which is formed directly on the substrate or through the protective layer composing of at least one of the inorganic and organic substances and which records the information by exposure to recording laser beam, and a reflective layer to reflect said laser beam. Its reflectivity is 85 percent or more with respect to the laser beam for reproduction, and its electrical resistivity is 7 μΩ·cm or more at 298K.

In the recording layer of the information recording medium according to the present invention the organic or inorganic substance deforms under exposure to the laser beam for recording, or the organic substance, without deforming under exposure to the laser beam for recording, undergoes phase shift (one amorphous phase or crystalline phase to another phase), photodarkening or atomic diffusion (atomic diffusion between the recording layer and absorbing layer) as change in atomic arrangement. Information is reproduced by using the laser beam for reproduction which has exposure time and power causing no change in the recording layer.

Of the information recording media according to the present invention, those having an initial reflectivity of 70 percent or more on the unrecorded mark and a reflectivity of 28 percent or less on the recorded mark are preferred because they ensure complete conformity to the Red Book (a CD standard) and Orange Book Part II (a standard for CD-WO (write once CD)).

The reflective film of the information recording medium according to the present invention has the average composition in the direction of the film thickness which can be expressed by the general formula $(Au)_{100-x} (A)_x$ (where x is $0.5 \leq x \leq 15$ in terms of atomic percentage, and the element represented by "A" is assumed to be at least one element of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, T1, Pb and Bi), or by the general formula $(Au)_{100-y} (D)_y$ (where y is $15 \leq y \leq 85$ in terms of atomic percentage, and the element presented by "D" is assumed to be at least one element of Ag and Cu). The reflectivity of wavelength from 600 to 900 nm with respect to the laser beam for reproduction is as high as 85 percent or more, and the electrical resistivity is 7 μΩ·cm or more at 298K; therefore, the thermal conductivity is as low as 105 W/m·K. So when using the reflecting layer having a reflectivity with respect to said reproduction laser beam from the substrate registering 65 percent or more on the unrecorded mark or 65 percent or more on the recorded mark, it is possible to improve the recording sensitivity and erasing sensitivity substantially. "1 <x<8" in the composition ratio of said reflective layer is preferable in that the reflectivity of the reflective layer is high, and "2<x<5" is more preferable in that the thermal conductivity is low because the reflectivity of the reflective layer is high and electric resistivity is high. Furthermore, 30<y<70 is preferred in that the thermal conductivity is low because the electric resistivity of the reflecting layer is high. That the element represented by "A" is Co in the constituent element of said reflectivity layer is preferred in that recording sensitivity and erasing sensitivity are excellent. That the element represented by "A" is Pd is preferred in that the oxidation resistance of the reflecting layer is excellent. That the element represented by "A" is Ti is preferred in that crystal grain size of the reflecting layer is small and the noise is small. That the element represented by "A"'is Mo is preferred in that close contact of the reflecting layer is excellent, and the erasing ratio in the rewritable type is large. That the element represented by "B" is Ag is preferred in that the flatness of the reflective layer surface is excellent with small noise. On the other hand, when the element represented by "A" is Ni, the adhesion of the reflective layer is weaker than that when other elements are added, resulting in restrictions given to the number of rewritings in the rewritable type. If the element represented by "A" is Cr, the undulation on the reflective layer surface is slightly larger than that when other elements are added, resulting in slightly greater disk noise.

The film thickness of said reflective layer is 20 to 500 nm inclusive when it is used as a reflective layer or upper reflective layer of the information recording medium where the recording layer to record information by exposure to the recording laser beam is composed of the organic or inorganic substance deformed under exposure to the recording laser beam, or the information recording medium comprising the inorganic substance whose optical constant is modified by change in atomic arrangement taking place without deformation under exposure to the laser beam for recording, wherein the medium is formed in the order of the substrate, lower dielectric protective layer, recording layer, upper dielectric protective layer and reflective layer, with the formation starting from the substrate, or it is formed in the order of the substrate, lower reflective layer, lower dielectric protective layer, recording layer, upper dielectric protective layer and upper reflective layer, with the formation starting from the substrate. The thickness of 30 to 300 inclusive is more preferred since it allows reflectivity and recording sensitivity to be made sufficiently high; the thickness of 40 to 150 nm inclusive is particularly preferred.

The film thickness of the said reflective layer is 2 to 40 nm inclusive when said reflective layer is used as a lower reflective layer of the information recording medium where the recording layer to record information by exposure to the recording laser beam is composed of the inorganic substance whose optical constant is modified by change in atomic arrangement taking place without deformation under exposure to the laser beam for recording, wherein the medium is formed in the order of the substrate, lower reflective layer, lower dielectric protective layer, recording layer, upper dielectric protective layer and upper reflective layer, with the formation starting from the substrate. The film thickness of 3 to 30 nm inclusive is preferred since it allows reflectivity and recording sensitivity to be made sufficiently high. The thickness of 5 to 20 nm inclusive is particularly preferred. Even if the lower and upper reflective layers are composed differently, they can be used as information recording media according to the present invention if the respective film thicknesses are within said range, and respective compositions are within the effective composition range disclosed in the present invention.

Chalcogenide containing at least one of the elements Se and Te can be used as the recording layer of the information recording medium according to the present invention comprising the inorganic substance, whose optical constant is modified by change in atomic arrangement taking place without deformation under exposure to the laser beam for recording.

When above recording layer is chalcogenide mainly comprising Se (at least 30 at % and at most 90 at %), it is preferred to be composed of Se and at least one of the elements In, Sb, Sn, Te, Bi, Si, Ge, Pb and Ga. Said recording layer is preferred since the stability of amorphous state is improved by addition of a small amount (10 atomic percent or less) of such transition metals as Co, Pd, Ti, V, Cr, Mn, Fe, Ni, Cu, Ag, Au, etc. The chalcogenide including the Se and Sb as major components, while maintaining the stability of amorphous state, provides high-speed crystallization during recording, ensuring considerably high acidity resistance of the recording layer. Furthermore, addition of the 4b group elements including Sn, Si, Ge and Pb further improves the stability of amorphous state and ensures high speed crystallization during recording; therefore, this is fitted to the write-once type medium. The alloy system mainly comprising Se and In allows repetition of the layer transition between the crystalline and amorphous states several times. Addition of the Tl and the transition mental including Co and Pb from 3 percent to 10 percent inclusive further improves the crystallization speed; therefore, this is suitable for the rewriting type medium.

When said recording layer is made up of chalcogenide mainly comprising the Te (at least 30 at % and at most 90 at %), it is preferred to be composed of Te and at least one of the elements Ge, Sb, In, Sn, Se, Bi, Si, Pb and Ga. Addition of transition metal including Co, Pd, Ti, V, Cr, Mn, Fe, Ni, Cu, Ag and Au by 10 at. percent or less to said recording layer improves stability of the amorphous state; this is preferable. The chalcogenide mainly comprising Te and Ge; Te, Ge and Sb; or Te, In and Sb allows stable and high speed layer transition between crystalline and amorphous states to be repeated several times; this is fitted for the rewriting type medium.

The lower and upper dielectric protective layers of the information recording medium according to the present invention comprising the inorganic substance whose optical constant is modified by change in atomic arrangement taking place without deformation under exposure to the laser beam for recording, if the extinction coefficient at the imaginary part of complex refractive index with respect to laser beam is 0.2 or less, allow use of such inorganic substances as oxides, nitrides, sulfides and selenides, their mixtures or organic compounds, and the mixture between organic substances and inorganic substances. Said extinction coefficient is preferably 0.1 or less since the medium reflectivity on the unrecorded mark can be increased. Said inorganic substance may include the oxide of at least one element selected from the group consisting of Ce, La, Si, In, Al, Ge, Pb, Sn, Bi, Te, Ta, Sc, Y, Ti, Zr, V, Nb, Cr and W, the fluoride of Mg, Ce and Ca, the nitride of Si, Al, Ta and B, the sulfide of at least one element selected from the group consisting of Zn, Cd, Ga, In, Sb, Ge, Sn, Pb and Bi, the selenide of at least one element selected from the group consisting of Zn, Cd, Ga, In, Sb, Ge, Sn, Pb and Bi, and their mixtures. They include, for example, the substance whose major component has the composition close to that of one of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $Ta_2O_5$, $Sc_2O_3$, $Y_2O_3$, $TiO_2$, $ZrO_2$, $V_2O_5$, $Nb_2O_5$, $Cr_2O_3$, $WO_2$, $WO_3$, $MgF_2$, $CeF_3$, $CaF_2$, $TaN$, $Si_3N_4$, $AlN$, $BN$, $ZnS$, $CdS$, $In_2S_3$, $Sb_2S_3$, $Ga_2S_3$, $GeS$, $SnS$, $SnS_2$, $PbS$, $Bi_2S_3$, $ZnSe$, $CdSe$, $In_2Se_3$, $Sb_2Se_3$, $Ga_2Se_3$, $GeSe$, $SnSe$, $SnSe_2$, $PbSe$, $Bi_2Se_3$, and their mixtures. Of these, the preferred oxides are those having the composition close to that of $SiO_2$, $SiO$, $Y_2O_3$, $Sc_2O_3$, $CeO_2$, $TiO_2$, $ZrO_2$, $Ta_2O_5$, $In_2O_3$, $Al_2O_3$, or $SnO_2$. The nitride should preferably have the composition close to that of $Si_3N_4$, $AlN$ (aluminum nitride) or TaN. The sulfide should preferably has the composition close to that of the ZnS. The mixture between ZnS and $SiO_2$ is preferred as the mixture. Acrylic resin, polycarbonate, polyolefin, epoxy resin, polyimide, polyamide, polystyrene, polyethylene, polyethyleneterephtalate, fluorocarbon resin such as polytetrafluoroethylene (teflon), ethylene-vinyl acetate copolymer and ultraviolet light cured resin, as well as their mixtures can be used as the organic substance. The upper dielectric may have the multiple structures composed of an inorganic substance and an inorganic substance, an inorganic substance and an organic substance, or an organic substance and an organic substance. In the case of said multiple structure, the layer having a low thermal conductivity is formed in the absorbing layer and boundary surface, resulting in improved recording sensitivity; this is preferred.

To form said layers, any of the following methods is used; vacuum evaporation, evaporation in gas, sputtering, ion beam evaporation, ion plating, electron beam evaporation, spin coating, plasma polymerization, injection molding, photopolymerization (2 P method), and casting. If the reflective layer, recording layer made up of inorganic substances and protective layer made up of inorganic substances are all formed by sputtering, management of the composition and film thickness will be facilitated, contributing to production cost reduction; this is preferred for such reasons.

The information recording medium according to the present invention can be used in the form of tapes and cards in addition of disks.

DESCRIPTION OF THE PREFERRED EMBODIMENTS

Figure 1:
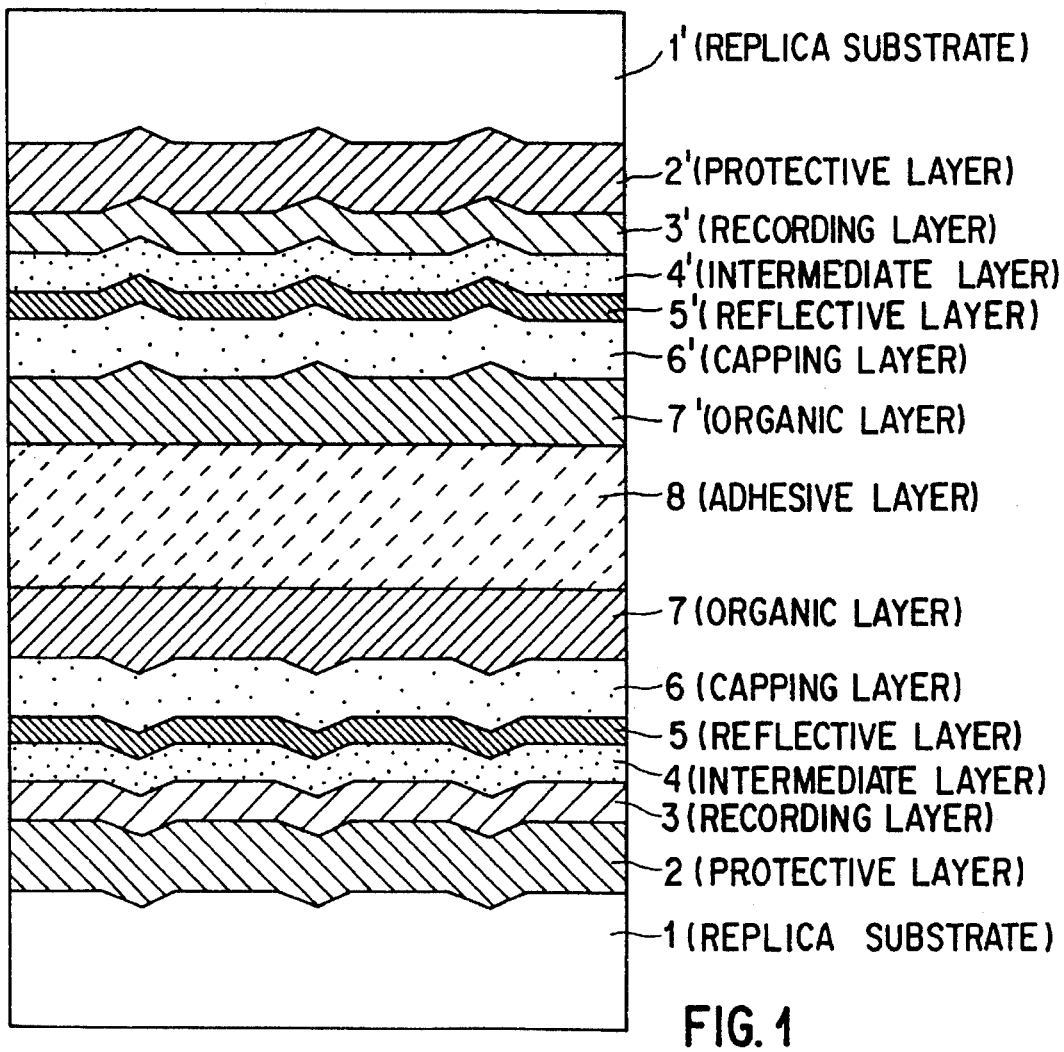
FIG. 1 is a sectional view illustrating the structure of the both side recordable disk type information recording medium according to an embodiment of the present invention.

FIG. 1 is a sectional view showing the structure of embodiments 1 to 20 of the information recording medium according to the present invention.

In this both-side recordable disk, 1 and 1' denote the replica substrate, 2 and 2' the protective layer, 3 and 3' the recording layer, 4 and 4' the intermediate layer, 5 and 5' the reflective layer, 6 and 6' the capping layer, 7 and 7' the organic layer and 8 the adhesive layer. Polycarbonate resin or glass is often used for replicas 1 and 1'. Protective layers 2 and 2' can be formed of the oxide of at least one element selected from the group consisting of Ce, La, Si, In, Al, Ge, Pb, Sn, Bi, Te, Ta, Sc, Y, Ti, Zr, V, Nb, Cr, W and others, the fluoride of at least one element selected from the group consisting of Mg, Ce, Ca and others, the nitride of at least one element selected from the group consisting of Si, Al, Ta, B and others, the sulfide of at least one element selected from the group consisting of Cd, Zn, Ga, In, Sb, Ge, Sn, Pb, Bi and others, the carbide of at least one element selected from the group consisting of B, Si and others, and the inorganic substance mainly comprising the boride of such as Ti, boron, carbon or metal. To be concrete, the protective layer can have the major component made up of one of $CeO_2$, $La_2O_3$, SiO, $SiO_2$, $In_2O_3$, $Al_2O_3$, GeO, $GeO_2$, PbO, SnO, $SnO_2$, $Bi_2O_3$, $TeO_2$, $Ta_2O_5$, $Sc_2O_3$, $Y_2O_3$, $TiO_2$, $ZrO_2$, $V_2O_5$, $Nb_2O_5$, $Cr_2O_3$, $WO_2$, $WO_3$, CdS, ZnS, $In_2S_3$, $Sb_2S_3$, $Ga_2S_3$, GeS, SnS, $SnS_2$, PbS, $Bi_2S_3$, $MgF_2$, $CeF_3$, $CaF_2$, TaN, $Si_3N_4$, AlN, BN, Si, $TiB_2$, $B_4C$, SiC, B and C, or can have a composition close thereto, or a mixture thereof. Of said components, the oxide is preferred to have the composition close to $SiO_2$, $Y_2O_3$, $Sc_2O_3$, $CeO_2$, $TiO_2$, $ZrO_2$, SiO, $Ta_2O_5$, $In_2O_3$, $Al_2O_3$ or $SnO_2$. Some of the nitrides have the composition similar to that of TaN, $Si_3N_4$, or AlN (aluminum nitride). Their surface reflectivity is no very high and the layer is stable and sturdy; these features are preferred. Some of sulfides have the composition close to that of ZnS, and are preferred since the reflectivity is proper and the layer is stable. The amorphous Si containing hydrogen is also preferred.

The substrates 1 and 1' mainly composed of glass, quartz, sapphire, iron, titanium or aluminum can also work as protective layers 2 and 2'; therefore, when such materials are used for substrates, protective layers 2 and 2' need not be provided.

On the other hand, protective layers 2 and 2' may be formed by acrylic resin, polycarbonate, polyolefin, epoxy resin, polyimide, polyamide, polystyrene, polyethyleneterephtalate, fluorocarbon resin such as polytetrafluoroethylene (teflon) and ultraviolet light cured resin, for example. Substrates 1 and 1' using them can work as protective layers 2 and 2' like the substrates such as glass.

It should be noted that excessive thinness of the substrate will lead to insufficient strength, while excessive thickness of the substrate will lead to the inability of being accommodated in a small spot, resulting in reduced recording density and recording sensitivity. Therefore, thickness should be 0.1 to 6 mm.

Inorganic substances are preferred for the protective layers 2 and 2' because of heat resistance. However, increased thickness of the protective layers of inorganic substances (except for the case of substrates) will cause the cracks, and reduction in transmissivity and sensitivity. Therefore, the protective layers of inorganic substances 2 and 2' are decreased in thickness, thick organic layers are placed in a close contact with the side of protective layers 2 and 2' opposite to recording layers 3 and 3', thereby increasing the mechanical strength. This organic layer may be substrates 1 and 1'. This organic layer may be composed, for example, of polystyrene, polytetrafluoroethylene (teflon), polyimide, acrylic resin, polyolefin, polyethyleneterephtalate, polycarbonate, epoxy resin, ethylene vinyl acetate copolymer known as hotmelt resin adhesive, or similar adhesives and ultraviolet light cured resin.

The multi-layered structure of protective layers 2 and 2' will improve the protection efficiency. For example, the thin film having a composition similar to that of the $SiO_2$ having the film thickness of 30 to 300 nm is formed on the replica substrates 1 and 1', on which thin film having a composition similar to that of the ZnS having the film thickness of 30 to 300 nm is formed as a protective layers 2 and 2'. This will greatly improve the environment resistance and recording and erasing properties are, and will increase the number of rewritings considerably.

Recording layers 3 and 3' preferably comprise at least one of Se and S, and at least one element selected from the group consisting of In, Sn, Te, Bi, Si, Pb and Ga. Furthermore, the stability of amorphous state is improved by adding at least one of the elements Tl, Co, Pd, Ti, V, Cr, Mn, Fe, Co, Ni, Cu, Ag and Au by 10 at. percent or less; this is preferred. In the alloy system mainly composed of Se and Sb, the crystallization speed can be increased with the stability of amorphous state maintained, and acid resistance is also improved considerably; this is suitable for the write-once type medium. Addition of the quadrivalent elements Sn, Si and Pb further improves the stability of amorphous state and ensures higher speed in crystallization; this is suitable for the write-once type medium. In the alloy system mainly composed of Se and In, phase change between crystalline state and amorphous state can be repeated; this feature is preferable for the rewrite type medium. Furthermore, when comprising Se, In, and at least one element selected from the group consisting of Sn, Te, Bi, Si, Pb, Ga, Sb and Ge, the number of rewritings will be increased; this is more preferable. Moreover, addition of such elements as Tl and Co will further improves the crystallization speed; this feature is preferable to the rewrite type medium.

The content of the Se or S in the recording layers 3 and 3' should preferably be from 40 at. percent to 90 at. percent incl. since the extinction coefficient is reduced and acid resistance is improved. Further, 50 at. percent or more is more preferable and 55 at. percent or more is particularly preferable, and 60 at. percent or more is more to be preferred.

In recording layers 3 and 3', it is preferred that the extinction coefficient at the imaginary part of complex refractive index with respect to reproduction laser beam at unrecorded or recorded state is 0.2 or less in order to keep the medium reflectivity above 65 percent. Furthermore, extinction coefficient is preferably 0.05 or more because of effective absorption of laser beam.

The intermediate layers 4 and 4' and capping layers 6 and 6' can be formed of the inorganic substances mainly comprising the oxide of at least one element selected from the group consisting of Ce, La, Si, In, Al, Ge, Pb, Sn, Bi, Te, Ta, Sc, Y, Ti, Zr, V, Nb, Cr and W, the fluoride of at least one element selected from the group consisting of Mg, Ce and Ca, the nitride of at least one element selected from the group consisting of Si, Al, Ta and B, the sulfide of at least one element selected from the group consisting of Cd, Zn, Ga, In, Sb, Ge, Sn, Pb and Bi, and the selenide of at least one element selected from the group consisting of Cd, Zn, Ga, In, Sb, Ge, Sn, Pb and Bi; their mixtures can also be used to form such layers. To be concrete, the major component can be made up of one of $CeO_2$, $La_2O_3$, SiO, $SiO_2$, $In_2O_3$, $Al_2O_3$, GeO, $GeO_2$, PbO, SnO, $SnO_2$, $Bi_2O_3$, $TeO_2$, $Ta_2O_5$, $Sc_2O_3$, $Y_2O_3$, $TiO_2$, $ZrO_2$, $V_2O_5$, $Nb_2O_5$, $Cr_2O_3$, $WO_2$, $WO_3$, $MgF_2$, $CeF_3$, $CaF_2$, TaN, $Si_3N_4$, AlN, BN, CdS, ZnS, $In_2S_3$, $Sb_2S_3$, $Ga_2S_3$, GeS, SnS, $SnS_2$, PbS, $Bi_2S_3$, CdSe, ZnSe, $In_2Se_3$, $Sb_2Se_3$, $Ga_2Se_3$, GeSe, SnSe, $SnSe_2$, PbSe, $Bi_2Se_3$, and their mixtures. The major component can also have a composition close thereto, or a mixture thereof. Of said components, the oxide is preferred to have the composition equal to or similar to $SiO_2$, $Y_2O_3$, $Sc_2O_3$, $CeO_2$, $TiO_2$, $ZrO_2$, SiO, $Ta_2O_5$, $In_2O_3$, $Al_2O_3$ and $SnO_2$. $SiO_2$ or the mixture containing it can reduce the thermal expansion of the film when exposed to the laser beam, resulting in little increase in noise after frequent rewriting; this feature is preferred in particular. The nitride is preferred to be one of $Si_3N_4$, AlN (aluminum nitride) or TaN or should have the composition close thereto. The sulfide is preferred to be ZnS or to have the composition close thereto. ZnS or the mixture containing it can reduce the thermal expansion of the film when exposed to the laser beam, resulting in little increase in noise after frequent rewriting; this feature is preferred in particular.

The same composition as that of the recording layers 3 and 3' can be used at a reduced cost; this feature is preferable.

The intermediate layers 4 and 4' and capping layers 6 and 6' can be formed of the following organic substances and their mixtures; acrylic resin, polycarbonate, polyolefin, epoxy resin, polyimide, polyamide, polystyrene, polyethyleneterephtalate, fluorocarbon resin such as polytetrafluoroethylene (teflon), ethylene-vinyl acetate copolymer and ultraviolet light cured resin.

Furthermore, the intermediate layers 4 and 4' and capping layers 6 and 6' can be formed of the mixture of said inorganic substances and organic substances. It can also have the multiple structure composed of an inorganic substance and an inorganic substance, an inorganic substance and an organic substance, or an organic substance and an organic substance.

For the intermediate layers 4 and 4' and capping layers 6 and 6', the extinction coefficient at the imaginary part of complex refractive index with respect to reproduction laser beam at unrecorded or recorded state is preferably 0.2 or less, 0.1 or less in particular, since the medium reflectivity can be increased at the unrecorded and recorded marks. Generally, the extinction coefficient is proportional to light absorption coefficient; therefore, greater extinction coefficient will cause the beam to be damped on the way, making it difficult to maintain the high reflectivity from the reflective layer. For this reason, the extinction coefficient of the intermediate layers 4 and 4' is preferably 0.2 or less.

The production cost can be reduce by the use of the material of the same composition for the intermediate layers 4 and 4' and capping layers 6 and 6'; this is preferred.

When the reflective layers 5 and 5' are sufficient thick, having a film thickness of 50 nm or more, providing a reflectivity of 70 percent or more with respect to the reproduction laser beam, it is possible to use the metal, semimetal, semiconductor or their alloy with a thickness of 15 to 25 nm. For example, when using the major material having a reflectivity of 80 percent such as in the case of Al, Au, Ag, Cu or their alloy, the reflectivity of the both-side recordable disk A is increased to 70 percent or more and reproduced signal intensity can be increased when the information is reproduced; this is preferable. Of these materials featuring a high reflectivity, Al or its alloy is used; then the cost will be reduced. Furthermore, use of metals featuring a high heat conductivity such as Au, Ag, Cu, Au alloy, Ag alloy and Cu alloy will reduce unwanted temperature rise on each layer when exposed to laser beam and will prevent film deformation. This feature causes very little rise in noise despite repeated rewriting; this is preferred. Of the metals featuring a high heat conductivity, Au or its alloy will provide the highest environment resistance, ensuring the maximum data life. This characteristic is preferred.

Use of the Cu or its alloy will cut the cost. Organic layers 7 and 7' are the same as said protective layers 2 and 2', except that the material is restricted to the organic substance.

The recording layers 3 and 3', intermediate; layers 4 and 4', reflective layers 5 and 5' and capping layers may have the composition changed in the direction of film thickness. The change of the composition should preferably be continuous.

Layers can be formed in any of the following methods; vacuum evaporation, evaporation in gas, sputtering, ion beam evaporation, ion plating, electron beam evaporation, injection molding, casting, spin coating and plasma polymerization.

When the protective layers 2 and 2' are inorganic, they can be formed in electron beam evaporation or sputtering. It can also be formed by reactive sputtering such that, after the layer composed of at least one element of the metal, semimetal and semiconductor has beam formed, it is made to react with at least one of oxygen, sulfur and nitrogen. It should be noted that formation by sputtering will ensure easy management of the composition and film thickness, resulting in reduced production cost; this is preferable.

Formation of recording layers 3 and 3' by sputtering will ensure easy management of the composition and film thickness, resulting in reduced production cost; this is preferable. Formation of recording layers 3 and 3' by sputtering normally uses argon gas. Sputtering may be performed by nitrogen gas mixed in argon gas. This will permit extinction coefficient to be reduced even with little Se or S content. The nitrogen gas concentration is preferred to be kept from 3 mol percent to 30 mol percent inclusive.

Formation of reflective layers 5 and 5' by sputtering will ensure easy management of the composition and film thickness, resulting in reduced production cost; this is preferable.

The following illustrates the preferred range of film thickness for each layer when consideration is given to the medium reflectivity and recording sensitivity of the medium:

| Layer | Film thickness (nm) |
|---|---|
| Protective layers 2 and 2' | 20 to 1000 (for inorganic substance) |
| Protective layers 2 and 2' | 500 nm to 10 mm (for organic substance) |

-continued

| Layer | Film thickness (nm) |
| --- | --- |
| Recording layers 3 and 3' | 50 to 120 |
| Intermediate layers 4 and 4' | 10 to 200 |
| Reflective layers 5 and 5' | 15 to 25 |
| Capping layers 6 and 6' | 20 to 500 |

This is the combination which ensures that reflectivity of the unrecorded mark or recorded mark with respect to laser beam from replica substrates 1 and 1' is 65 percent or more.

Protective layers having a thickness smaller than said range will have poor protection efficiency, whereas those having a thickness greater than said range will have such problems as poor transmissivity. This is not preferred. Moreover, the inorganic substance is tough but brittle, while the organic substance is soft but flexible. Thus, the preferred range of the protector layer thickness is limited to thinner range in the inorganic substance than in the organic substance.

The following illustrates the preferred range of film thickness for each layer when consideration is given to the medium reflectivity and recording sensitivity of the medium:

| Layer | Film thickness (nm) |
| --- | --- |
| Protective layers 2 and 2' | 20 to 1000 (for inorganic substance) |
| Protective layers 2 and 2' | 500 nm to 10 mm (for organic substance) |
| Recording layers 3 and 3' | 70 to 110 |
| Intermediate layers 4 and 4' | 10 to 180 |
| Reflective layers 5 and 5' | 15 to 25 |
| Capping layers 6 and 6' | 50 to 400 |

This is the combination which ensures that reflectivity of the unrecorded mark or recorded mark with respect to laser beam from replica substrates 1 and 1' is 65 percent or more.

The following illustrates the preferred range of film thickness for each layer when consideration is given to the medium reflectivity and recording sensitivity of the medium:

| Layer | Film thickness (nm) |
| --- | --- |
| Protective layers 2 and 2' | 40 to 600 (for inorganic substance) |
| Protective layers 2 and 2' | 2 μm to 1 mm (for organic substance) |
| Recording layers 3 and 3' | 80 to 100 |
| Intermediate layers 4 and 4' | 30 to 160 |
| Reflective layers 5 and 5' | 20 to 25 |
| Capping layers 6 and 6' | 100 to 300 |

This is the combination which ensures that reflectivity of the unrecorded mark or recorded mark with respect to laser beam from replica substrates 1 and 1' is 65 percent or more.

It should be noted that the materials and film thicknesses of the said layers other than the recording layer are not limited to the recording layers related to the present invention, but apply to the cases of using the phase-change type recording layer, mutual diffusion type recording layer or magneto-optical recording layer not contained in the present invention.

EMBODIMENT 1

Both-side recordable disk A in FIG. 1 were manufactured by the production method having the following processes:

<1> Using the injection molding method, 1.5 μm-pitch spiral grooves for tracking were formed on the surface of disk-shaped polycarbonate plate having a diameter of 130 mm and a thickness of 1.2 mm, and one circumference was divided into 49 sectors. At the start of each sector, track addresses or sector addresses (referred to as "header portion") were formed on the crests between grooves (referred to as "recording track") in the form of the undulating pit, and was made into replica substrate 1. Noise generated from grooves can be avoided by the crests between grooves made into recording tracks.

<2> Using the radio frequency (rf) magnetron sputtering apparatus on said replica substrate 1, the protective layer 2 of $SiO_2$ was formed to have a film thickness of 250 nm.

<3> Then the recording layer 3 having the composition of $(In)_{45} (Se)_{55}$ in terms of atomic percent was made to have a film thickness of 90 nm inside the same sputtering apparatus.

<4> Then the intermediate layer having the composition of $(ZnS)_{60} (SiO_2)_{40}$ in terms of atomic percent was made to have a film thickness of 75 nm inside the same sputtering apparatus.

<5> Then the reflective layer 5 having the composition of $(Al)_{20} (Au)_{80}$ in terms of atomic percent was made to have a film thickness of 20 nm inside the same sputtering apparatus.

<6> Then the capping layer 6 having the composition of $(ZnS)_{60} (SiO_2)_{40}$ in terms of atomic percent was made to have a film thickness of 200 nm inside the same sputtering apparatus.

<7> Then ultraviolet light cured resin was spin-coated on the capping layer 6 and was cured to be made into organic layer 7 have a thickness of 50 μm. Generally, the thickness of organic layers 7 and 7' can be 10 to 100 μm. This is the range of thickness where the organic substance can be spin-coated and the organic layer does not easily peel off.

<8> In the same way, protective layer 2', recording layer 3', intermediate layer 4', reflective layer 5', capping layer 6' and organic layer 7' were formed on another replica substrate 1' in that order.

<9> Two one-sided disks manufactured in this way were put together by adhesive layer 8, with the sides of organic layers 7 and 7' facing inside, thereby producing the both-side recordable disk A. The hotmelt adhesive was used for adhesive layer 8. Generally, hotmelt adhesive or two-part thermosetting adhesive is used for adhesive layer 8.

The said both-side recordable disk A was used as a reversible disk to evaluate recording, erasing and reproduction using the laser disk drive (recording, erasing and reproduction).

<1> The both-side recordable disk A was rotated at the linear velocity of 1.2 m/s (rotation rate at 270 rpm and radial position at 43 nm).

<2> Continuous low level laser power beam emitted from the semiconductor laser having a wavelength of 780 nm was condensed by the objective lens with a numerical aperture of 0.55 located in the optical head, and was emitted in the radial position of recording layer 3 through replica substrate 1. When the reflected beam was detected, the optical head was driven so that the center of the optical spot would agree with the recording tack at all times, thereby performing tracking. Moreover, automatic focus alignment was conducted to ensure that the focus would be located on recording layer 3. This tracking method is well-known.

Figure 2:
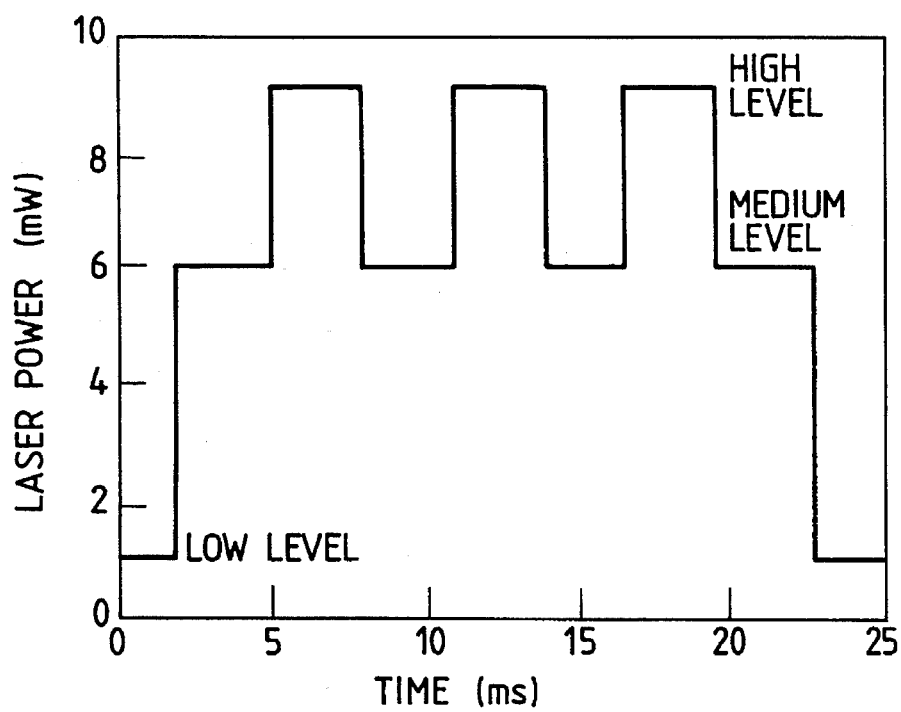
FIG. 2 is a graph illustrating recording laser waveform for overwrite according to an embodiment of the present invention.

<3> Without initializing the both-side recordable disk A, 11 T repetitive signal (0.17 MHz, duty 50%) at EFM (8–14 modulation) was recorded by overwriting according to the one-beam method. As shown in FIG. 2, the power level used on the disk side was the intermediate level (6 mW) causing crystal state the portion to be recorded, and the high level (9 mW) causing amorphous state on the portion to be erased. The other portion than those to be recorded and erased has the low level (1 mW).

Said EFM (Eight Fourteen Modulation, 8–14 modulation) modulates and records repetitive signal length. When T is used as the detection window, it records the mark of the length from 3 T to 11 T. This is to avoid continued 0 or 1.

<4> Continuous low level (1 mW) beam was emitted and the reflected light intensity was detected and reproduced. Reflectivity on the reflective portion at the intermediate level (6 mW) was 72 percent, and that on the reflective portion at the high level (9 mW) was 26 percent. Read-out signal output with carrier-to-noise ratio of 60 dB was obtained at the read-out signal modulation amplitude of 64 percent and resolution band width of 10 kHz. The ratio between the intermediate and high levels was found to be preferable between 0.4 to 1 and 0.8 to 1.

<5> Repetitive signal (0.36 MHz, duty 50%) of 6 T at EFM was overwritten on it.

<6> Continuous low level (1 mW) beam was emitted and the reflected light intensity was detected and reproduced. Reflectivity on the reflective portion at the intermediate level (6 mW) was 71 percent, and that on the reflective portion at the high level (9 mW) was 27 percent. Read-out signal output with carrier-to-noise ratio of 59 dB was obtained at the read-out signal modulation amplitude of 62 percent and resolution band width of 10 kHz. The preceding signal (11 T repetitive signal) erasing ratio of this read-out signal output was 29 dB. The possible number of rewritings at this time was over 100,000.

<7> The both-side recordable disk A is initialized by continuous intermediate level (6 mW) beam, reflectivity on the unrecorded portion was set to 72 percent. After that, recording and erasing given in <3> were conducted. The same result as <4> was obtained. Overwriting was carried out as described in <5> to get the same result as <6>. Here high level (9 mW) causing amorphous state was used at the portion to be recorded, while intermediate level (6 mW) causing crystal state was used at the portion to be erased. Therefore, if reflectivity is 65 percent or more on the unrecorded mark, and 45 percent or less on the recorded mark, or reflectivity is 45 percent or less on the unrecorded mark, and 65 percent or more on the recorded mark, then satisfactory recording and reproduction has been found to be obtained regardless of whether or not initialization is made before recording.

<8> When the record was rewritten, continuous beam was emitted at the level close to the said high level after the first one or more rotations, and the beam was turned off. Then laser beam modulated between the intermediate and high levels according to the information signal was emitted after the next one rotation and was recorded.

<9> When this was reproduced, carrier-to-noise ratio and preceding signal erasing ratio were improved. Moreover, the range of 0.9 to 1.1 times the high level was found to be preferable for the level close to the said high level.

The both-side recordable disk A is excellent in acidity resistance. When it was left for 3000 hours at 60 degrees Celsius and relative humidity of 95 percent, there was no change in the medium reflectivity or transmissivity with respect to laser beam.

The both-side recordable disk A recording 0.17 MHz signal at the disk linear speed 1.2 m/s was left for 3000 hours at 60° C. and relative humidity of 95 percent, there was no change in the read-out signal modulation amplitude or carrier-to-noise ratio.

Furthermore, the both-side recordable disk A recording 3 MHz 50 percent duty signal at the disk linear speed 11 m/s was left for 3000 hours at 60° C. and relative humidity of 95 percent, there was no change in the read-out signal modulation amplitude or carrier-to-noise ratio.

EMBODIMENT 2

To manufacture the both-side recordable disk B for this Embodiment, we changed the composition of the recording layer 3 of the both-side recordable disk A given in FIG. 1 so that it was composed of $(In)_{43} (Se)_{53} (Tl)_4$ in at. percent.

The said both-side recordable disk B was used as a reversible disk to evaluate recording, erasing and reproduction using the laser disk drive (recording, erasing and reproduction).

<1> The both-side recordable disk A was rotated at the linear velocity of 11 m/s (rotation rate at 2500 rpm and radial position at 42 mm).

Figure 3:
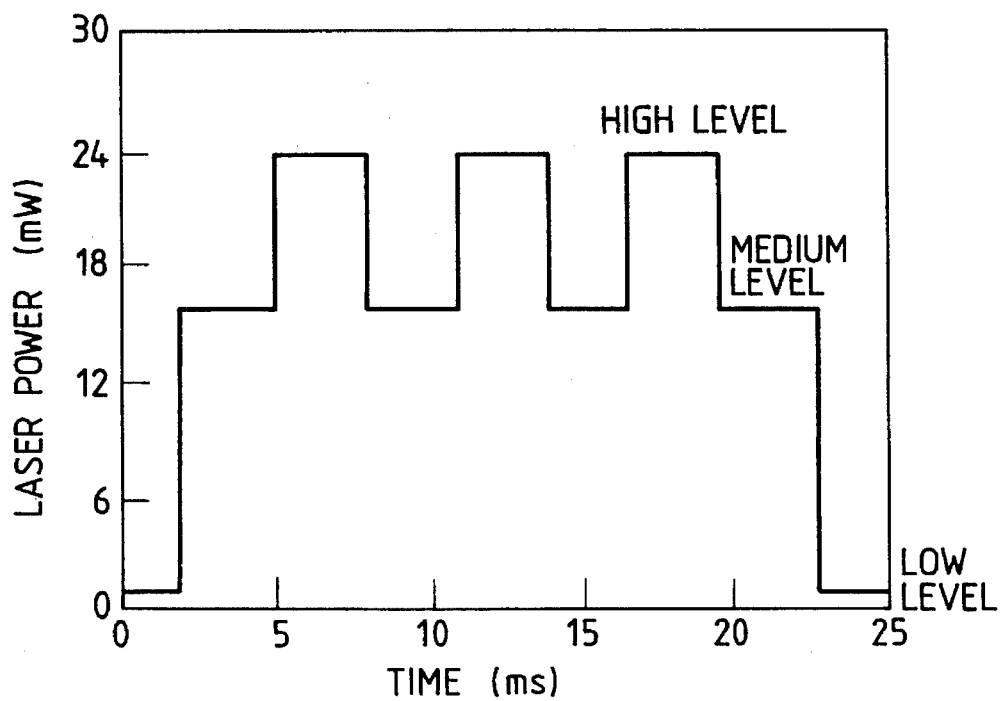
FIG. 3 is a graph illustrating recording laser waveform for overwrite according to another embodiment of the present invention.

<2> Without initializing the both-side recordable disk B, 3 MHz 50-percent duty signal was recorded by overwriting according to the one-beam method. As shown in FIG. 3, the power level used on the disk side was the intermediate level (16 mW) causing crystal state the portion to be recorded, and the high level (24 mW) causing amorphous state on the portion to be erased. The other portion than those to be recorded and erased has the low level (1 mW).

<3> Continuous low level (1 mW) beam was emitted and the reflected light intensity was detected and reproduced. Reflectivity on the reflective portion at the intermediate level (16 mW) was 72 percent, and that on the reflective portion at the high level (24 mW) was 26 percent. Read-out signal output with carrier-to-noise ratio of 61 dB was obtained at the read-out signal modulation amplitude of 64 percent and resolution band width of 10 kHz.

<4> 4 MHz, duty 50-percent signal was overwritten on it.

<5> Continuous low level (1 mW) beam was emitted and the reflected light intensity was detected and reproduced. Reflectivity on the reflective portion at the intermediate level (16 mW) was 71 percent, and that on the reflective portion at the high level (24 mW) was 25 percent. Read-out signal output with carrier-to-noise ratio of 60 dB was obtained at the read-out signal modulation amplitude of 62 percent and resolution band width of 10 kHz. The preceding signal (3 MHz duty 50 percent signal) erasing ratio of this read-out signal output was 28.5 dB. The possible number of rewritings at this time was over 300,000.

<6> The both-side recordable disk B is initialized by continues intermediate level (16 mW) beam, reflectivity on the unrecorded portion was set to 72 percent. After that, recording and erasing given in <2> were conducted. The same result as <3> was obtained. Overwriting was carried out as described in <4> to get the same result as <5>. Here high level (24 mW) causing amorphous state was used at the portion to be recorded, while intermediate level (16 mW) causing crystal state was used at the portion to be erased. Therefore, if reflectivity is 65 percent or more on the unrecorded mark, and 45 percent or less on the recorded mark, or reflectivity is 45 percent or less on the unrecorded mark, and 65 percent or more on the recorded mark, then satisfactory recording and reproduction has been found to be obtained regardless of whether or not initialization is made before recording.

The both-side recordable disk B is excellent in acidity resistance. When it was left for 3000 hours at 60° C. and relative humidity of 95 percent, there was no change in the medium reflectivity or transmissivity with respect to laser beam.

The both-side recordable disk B recording 0.17 MHz signal at the disk linear speed 1.2 m/s was left for 3000 hours at 60° C. and relative humidity of 95 percent, there was no change in the read-out signal modulation amplitude or carrier-to-noise ratio.

Furthermore, the both-side recordable disk B recording 3 MHz, 50-percent duty signal at the disk linear speed 11 m/s was left for 3000 hours at 60° C. and relative humidity of 95 percent, there was no change in the read-out signal modulation amplitude or carrier-to-noise ratio.

EMBODIMENT 3

To manufacture the both-side recordable disk C for the present embodiment, we changed the composition of the protective layer 2 of said both-side recordable disk A or B so that it was composed of one of ZnS, ZnS-SiO$_2$ system, SiO, CeO$_2$, Al$_2$O$_3$, Ta$_2$O$_5$, Y$_2$O$_3$, ZrO$_2$, V$_2$O$_5$, TaN, Si$_3$N$_4$ and AlN, or their mixture whose extinction coefficient at the imaginary part of complex refractive index with respect to reproduction laser beam was 0.2 or less. In this case, the film thickness of the protective layer 2 was controlled according to the optical constant of the composition. That is, the thickness was determined so that the reflectivity of the unrecorded mark or recorded mark would be 65 percent or more according to the optical constant of the protective layer.

The said both-side recordable disk C was used as a reversible disk to evaluate recording, erasing and reproduction using the laser disk drive (recording, erasing and reproduction). The same recording and erasing characteristics as those of said both-side recordable disk A were obtained.

EMBODIMENT 4

To manufacture the both-side recordable disk D for this embodiment, we changed the structure of the protective layer 2 of said both-side recordable disk A, B or C into a double layer structure such that the first layer of (ZnS)$_{60}$(SiO$_2$)$_{40}$ having a thickness of 160 nm was laid out on the side close to the recording layer 3, while the second layer of SiO$_2$ having a thickness of 250 nm was laid out on the side far to the recording layer 3.

Said both-side recordable disk D was used as a reversible disk to evaluate recording, erasing and reproduction using the laser disk drive (recording, erasing and reproduction). Rewriting was possible over 500,000 times and rewriting properties were excellent. That is, protection strength has been improved by laminating the films of the protective layer 2 to have double or multiple layer structure.

EMBODIMENT 5

To manufacture the both-side recordable disk E for this embodiment, we changed the structure of the protective layer 2 of said both-side recordable disk A, B or C into a double layer structure such that the first layer of (ZnS)$_{60}$(SiO$_2$)$_{40}$ having a thickness of 200 nm was laid out on the side close to the recording layer 3, while the second layer of SiO$_2$ having a thickness of 250 nm was laid out on the side far to the recording layer 3.

Said both-side recordable disk E was used as a reversible disk to evaluate recording, erasing and reproduction using the laser disk drive (recording, erasing and reproduction). Rewriting was possible over 700,000 times and rewriting properties were excellent. That is, protection strength has been improved by laminating the films of the protective layer 2 to have double or multiple layer structure.

EMBODIMENT 6

To manufacture the both-side recordable disk F for this embodiment, we changed the reflective layer 5 of the said both-side recordable disk B to have a film thickness of b 10to 30 nm.

This both-side recordable disk F was used as a reversible disk to record the 3 MHz, duty 50-percent signal at the disk linear speed of 11 m/s by overwriting and to evaluate it. The following shows recordable high level power range and intermediate level exposed portion reflectivity:

| Film thickness of the reflective layer 5 (nm) | High level power (mW) | Reflectivity (%) |
| --- | --- | --- |
| 10 | 20 | 50 |
| 15 | 22 | 68 |
| 20 | 24 | 72 |
| 25 | 27 | 74 |
| 30 | (Note 1) | — |

(Note 1: The recording sensitivity was reduced and recording was not possible at the power of 30 mW or less).

The result of the study has revealed that the preferable range of the thickness of reflective layer 5 is 15 to 25 nm inclusive.

EMBODIMENT 7

To manufacture the both-side recordable disk G for this embodiment, we changed the recording layer 3 of the both-side recordable disk A to have a film thickness of 40 to 130 nm, and the intermediate layer 4 to have a film thickness of 15 to 150 nm.

This both-side recordable disk G was used as a reversible disk to record the 0.17 MHz, duty 50-percent signal at the disk linear speed of 1.2 m/s by overwriting and to evaluate it.

The following shows the range of the film thickness of the intermediate layer 4 where the reflectivity of the intermediate level exposed portion is 65 percent or more and that of high level exposed portion is 45 percent or less:

| Film thickness of recording layer 3 (nm) | Range of film thickness of intermediate layer 4 (nm) | Range of optical thickness of intermediate layer 4 (nm) |
| --- | --- | --- |
| 40 | Not satisfied | Not satisfied |
| 50 | 135 to 150 | 170 to 300 |
| 70 | 120 to 135 | 240 to 170 |
| 90 | 15 to 115 | 30 to 230 |
| 110 | 10 to 90 | 20 to 180 |
| 120 | 15 to 30 | 30 to 60 |
| 130 | Not satisfied | Not satisfied | where optical thickness of the layer=refractive index x film thickness

The intermediate layer 4 of $(ZnS)_{60}(SiO_2)_{40}$ has a refractive index of 2.0.

The result of the study has revealed that the preferable range of the film thickness of the recording layer 3 is 50 to 120 nm inclusive.

EMBODIMENT 8

To manufacture the both-side recordable disk H for this embodiment, we changed the capping layer 6 of the both-side recordable disk B to have a film thickness of 10 to 600 nm.

This both-side recordable disk H was used as a reversible disk to record the 3 MHz duty 50-percent signal at the disk linear speed of 11 m/s and 4 MHz, duty 50-percent signal alternately by overwriting and to evaluate it.

The following shows recordable high level power range and the number of rewritings.

| Film thickness of the capping layer 6 (nm) | High level power (mW) | Number of rewritings |
|---|---|---|
| 10 | 20 | 2,000 |
| 20 | 20 | 100,000 |
| 50 | 21 | 15,0000 |
| 100 | 22 | 200,000 |
| 150 | 23 | 250,000 |
| 200 | 24 | 300,000 |
| 300 | 25 | 400,000 |
| 400 | 27 | 500,000 |
| 500 | 29 | 500,000 or more |
| 600 | (Note 2) | — |

(Note 2: The recording sensitivity was reduced and recording was not possible at the power of 30 mW or less).

The result of the study has revealed that the preferable range of the film thickness of the capping layer 6 is 20 to 500 nm inclusive.

EMBODIMENT 9

To manufacture the both-side recordable disk I for this embodiment, we changed the recording layer 3 of the both-side recordable disk A to have the percentage of Se content ranging from 30 to 95 at. percent.

This both-side recordable disk I was used as a reversible disk to record the 0.17 MHz, duty 50-percent signal at the disk linear speed of 1.2 m/s by overwriting and to evaluate it.

The following shows intermediate level exposed portion and crystallization temperature from the amorphous state:

| Se content (at %) | Reflectivity (%) | Crystallization temperature (°C.) |
|---|---|---|
| 30 | 47 | 125 |
| 35 | 57 | 135 |
| 40 | 65 | 155 |
| 45 | 68 | 230 |
| 50 | 70 | 290 |
| 55 | 72 | 310 |
| 60 | 74 | 320 |
| 70 | 75 | 280 |
| 90 | 75 | 150 |
| 95 | 75 | 60 |

The results of the study has revealed that the preferable range of the Se content is from 40 to 90 at. % inclusive.

EMBODIMENT 10

To manufacture the both-side recordable disk J for this embodiment, we changed the recording layer 3 of the both-side recordable disk B to have the percentage of Tl content ranging from 0 to 15 at. percent. The relative ratio between In and Se was kept constant.

This both-side recordable disk J was used as a reversible disk to record the 3 MHz, duty 50-percent signal at the disk linear speed of 11 m/s. Then the 4 MHz, duty 50-percent signal was overwritten on it and the result for the erasing ratio was evaluated.

Furthermore, the recording layer was exposed to the outside and was left at the relative humidity of 90 percent. Then the data retention life before read-out signal level is reduced to 5 dB was measured. The following shows the result of measurement:

| Tl content (at %) | Erasing ratio (dB) | Data retention life (hour) |
|---|---|---|
| 0 | 20 | 3,000 or more |
| 1 | 24 | 3,000 or more |
| 2 | 26 | 3,000 or more |
| 4 | 28.5 | 3,000 or more |
| 6 | 29.5 | 3,000 |
| 8 | 30 | 2,500 |
| 10 | 30 | 2,000 |
| 15 | 30 | 500 |

The result of the study has revealed that the preferable range of the Tl content for the disk linear speed of 11 m/s is from 2 to 10 at. % inclusive; in particular from 2 to 6 at. % inclusive.

EMBODIMENT 11

To manufacture the both-side recordable disk K for this embodiment, we changed the recording layer 3 of the both-side recordable disk B to have Co instead of Tl and to have the percentage of Co content ranging from 0 to 25 at. percent. The relative ratio between In and Se was kept constant.

This both-side recordable disk K was used as a reversible disk to record the 3 MHz, duty 50-percent signal at the disk linear speed of 11 m/s. Then the 4 MHz, duty 50-percent signal was overwritten on it and the result was evaluated. The following shows the recordable high level power and erasing ratio:

| Co content (at %) | High level power (mW) | Erasing ratio (dB) |
|---|---|---|
| 0 | 24 | 20 |
| 1 | 23 | 23 |
| 2 | 22 | 25 |
| 4 | 20 | 28 |
| 6 | 22 | 30 |
| 8 | 23 | 30 |
| 10 | 26 | 30 |
| 15 | 28 | 30 |
| 20 | 30 | 30 |
| 25 | Reduced recording sensitivity | — |

The results of the study has revealed that the preferable range of the Co content for the disk linear speed of 11 m/s is from 2 to 10 at. % inclusive; in particular from 2 to 8 at. % inclusive. The same result could be gained by using at least one element selected from among Ti, V, Cr, Mn, Fe, Ni, Cu, Pd, Ag and Au, instead of part or whole of Co.

EMBODIMENT 12

To manufacture the both-side recordable disk L for this embodiment, we changed part or whole of In in the composition of the recording layer 3 of the both-side recordable disk A or B to have at least one of the elements Sn, Te, Bi, Si, Pb and Ga.

Said both-side recordable disk L was used as a reversible disk to evaluate recording, erasing and reproduction using the laser disk drive (recording, erasing and reproduction). The same recording and erasing characteristics as those of the both-side recordable disk A or B could be obtained.

EMBODIMENT 13

To manufacture the both-side recordable disk M for this embodiment, we changed a part of In in the composition of the recording layer 3 of the both-side recordable disk A or B to have at least one element selected from among Sn, Te, Bi, Si, Pb, Ga, Sb and Ge.

Said both-side recordable disk M was used as a reversible disk to evaluate recording, erasing and reproduction using the laser disk drive (recording, erasing and reproduction). The same recording and erasing characteristics as those of the both-side recordable disk A or B could be obtained.

EMBODIMENT 14

To manufacture the both-side recordable disk N for this embodiment, we changed the composition of the intermediate layer 4 of the both-side recordable disk A to have one of ZnS, $SiO_2$, SiO, $Ceo_2$, $Al_2O_3$, $Ta_2O_5$, $Y_2O_3$, $ZrO_2$, $V_2O_5$, TaN, $Si_3N_4$ and AlN which cause multiple interference of laser beam as in the case of ZnS-$SiO_2$ system, or to have their mixture. The film thickness was controlled so that optical thickness of the film would be the same in conformity to refractive index of the composition.

Said both-side recordable disk N was used as a reversible disk to evaluate recording, erasing and reproduction using the laser disk drive (recording, erasing and reproduction). The same recording and erasing characteristics as those of the both-side recordable disk A could be obtained.

Of the said composition, ZnS or the mixture including it allows the film deformation to be reduced when exposed to laser; therefore, rise of noise was as small as 3 dB or less even if rewriting was conducted over 50,000 times.

Of the said composition, $SiO_2$ or the mixture including it allows the thermal expansion of the film to be reduced when exposed to laser; therefore, rise of noise was as small as 3 dB or less even if rewriting was conducted over 50,000 times.

EMBODIMENT 15

To manufacture the both-side recordable disk O for this embodiment, we changed the composition of the intermediate layer 4 of the both-side recordable disk B to have one of ZnS, $SiO_2$, SiO, $CeO_2$, $Al_2O_3$, $Ta_2O_5$, $Y_2O_3$, $ZrO_2$, $V_2O_5$, TaN, $Si_3N_4$ and AlN which caused multiple interference of laser beam as in the case of ZnS-$SiO_2$ system, or to have their mixture. The film thickness was controlled so that optical thickness of the film would be the same in conformity to refractive index of the composition.

Said both-side recordable disk O was used as a reversible disk to evaluate recording, erasing and reproduction using the laser disk drive (recording, erasing and reproduction). The same recording and erasing characteristics as those of the both-side recordable disk B could be obtained.

Of the said composition, ZnS or the mixture including it allows the film deformation to be reduced when exposed to laser if used for intermediate layer 4; therefore, rise of noise was as small as 3 dB or less even if rewriting was conducted over 50,000 times.

Of the said composition, $SiO_2$ or the mixture including it allows the thermal expansion of the film to be reduced when exposed to laser if used for intermediate layer 4; therefore, rise of noise was as small as 3 dB or less even if rewriting was conducted over 50,000 times.

EMBODIMENT 16

To manufacture the both-side recordable disk P for this embodiment, we changed the composition of the reflective layer 5 of the both-side recordable disk A to have one of Cu, Ag, Au and Al which have a high reflectivity of 80 percent or more as in the case of Al-Au system, or to have Cu alloy, Ag alloy, Au alloy or Al alloy including other elements.

Said both-side recordable disk P was used as a reversible disk to evaluate recording, erasing and reproduction using the laser disk drive (recording, erasing and reproduction). The same recording and erasing characteristics as those of the both-side recordable disk A could be obtained.

Of the said composition, Al, Cu, Al alloy or Cu alloy can be used to obtain the most economical product.

Of the said composition, Cu, Ag, Au, Cu alloy, Ag alloy, or Au alloy having a great thermal conductivity can be used to contain the unwanted temperature rise in each layer when exposed to laser beam and to prevent film deformation; therefore, rise of noise was as small as 3 dB or less even if rewriting was conducted over 50,000 times.

Of the said composition, Au or Au alloy can be used to provide the highest environment resistance. When exposed to the outside and left at the relative humidity of 90 percent, the data retention life before read-out signal level was reduced to 5 dB was 5,000 hours or more.

EMBODIMENT 17

To manufacture the both-side recordable disk Q for this embodiment, we changed the composition of the reflective layer 5 of the both-side recordable disk B to have one of Cu, Ag, Au and Al which have a high reflectivity of 80 percent or more as in the case of Al-Au system, or to have Cu alloy, Ag alloy, Au alloy or Al alloy including other elements.

Said both-side recordable disk Q was used as a reversible disk to evaluate recording, erasing and reproduction using the laser disk drive (recording, erasing and reproduction). The same recording and erasing characteristics as those of the both-side recordable disk A could be obtained.

Of the said composition, Al, Cu, Al alloy or Cu alloy can be used to obtain the most economical product.

Of the said composition, Cu, Ag, Au, Cu alloy, Ag alloy, or Au alloy having a great thermal conductivity can be used to contain the unwanted temperature rise in each layer when exposed to laser beam and to prevent film deformation; therefore, rise of noise was as small as 3 dB or less even if rewriting was conducted over 50,000 times.

Of the said composition, Au or Au alloy can be used to provide the highest environment resistance. When exposed to the outside and left at the relative humidity of 90 percent, the data retention life before read-out signal level was reduced to 5 dB was 5,000 hours or more.

EMBODIMENT 18

To manufacture the both-side recordable disk R for this embodiment, we changed the replica substrate 1 of the both-side recordable disk A or B to have one of into the replica substrate having the ultraviolet light cured resin with tracking groove formed on the surface of any one of the chemically reinforced glass plate, polycarbonate plate, polyolefin plate, epoxy plate and acrylic resin plate by photopolymerization.

Said both-side recordable disk R was used as a reversible disk to evaluate recording, erasing and reproduction using the laser disk drive (recording, erasing and reproduction). The same recording and erasing characteristics as those of the both-side recordable disk A or B could be obtained.

EMBODIMENT 19

To manufacture the both-side recordable disk S for this embodiment, we changed part or whole of Se constituting the recording layer 3 of the both-side recordable disk A into S.

Said both-side recordable disk S was used as a reversible disk to evaluate recording, erasing and reproduction using the laser disk drive (recording, erasing and reproduction). The same recording and erasing characteristics as those of the both-side recordable disk A could be obtained. The result of the study has revealed, however, that acidity resistance decreased with the increase in the amount of S.

EMBODIMENT 20

To manufacture the both-side recordable disk T for this embodiment, we changed part or whole of Se constituting the recording layer 3 of the both-side recordable disk B into S.

Said both-side recordable disk T was used as a reversible disk to evaluate recording, erasing and reproduction using the laser disk drive (recording, erasing and reproduction). The same recording and erasing characteristics as those of the both-side recordable disk B could be obtained. The result of the study has revealed, however, that acidity resistance decreased with the increase in the amount of S.

EMBODIMENT 21

The lower dielectric layer 10 having a film thickness of 180 nm with the composition of $(ZnS)_{60}(SiO_2)_{40}$ in terms of atomic percentage was formed by radio frequency (rf) magnetron sputtering apparatus on the replica substrate 9, where 1.5 µm pitch spiral tracking grooves were formed on the surface of the disk shaped polycarbonate plate having a diameter of 120 mm and a thickness of 1.2 mm by injection molding. Then the recording layer 11 having a film thickness of 30 nm with the composition of $In_{50}Se_{45}Co_5$ in terms of atomic percentage was formed inside the same sputtering apparatus. Then the upper dielectric layer 12 having a film thickness of 25 nm with the composition of $(ZnS)_{60}(SiO_2)_{40}$ in terms of atomic percentage was formed inside the same sputtering apparatus. Then the reflective layer 13 having a film thickness of 50 nm with the composition of $Au_{97}Co_3$ in terms of atomic percentage was formed inside the same sputtering apparatus. Furthermore, ultraviolet light cured resin spin-coated was cured and the organic layer 14 having a film thickness of 50 µm was formed on said reflective layer 13.

Figure 4:
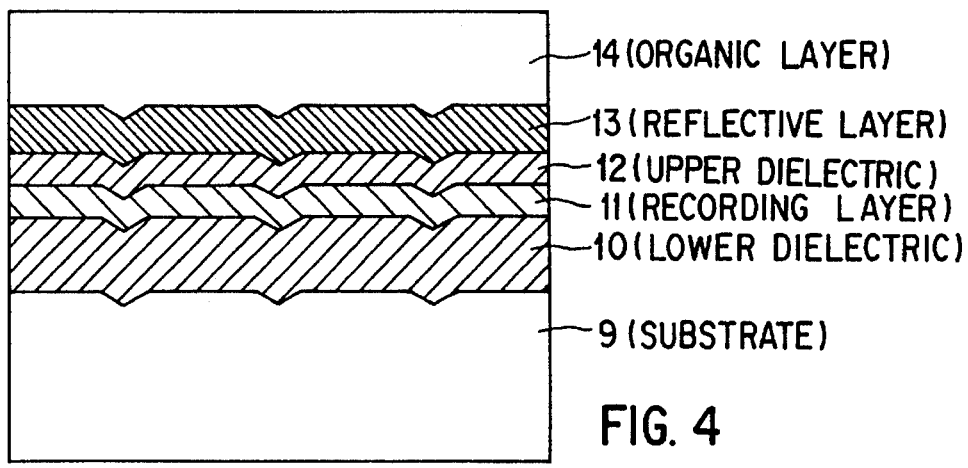
FIG. 4 is a sectional view illustrating the structure of the disk type the information recording medium according to still another embodiment of the present invention.

FIG. 4 illustrates the sectional structure of the disk U prepared in said manner. In the FIG. 9 denotes the substrate, 10 the lower dielectric, 11 the recording layer, 12 the upper dielectric, 13 the reflective layer and 14 the organic layer.

The disk U prepared in said manner was used as a reversible disk to evaluate recording, erasing and reproduction using the laser disk drive (semiconductor laser wave length: 780 nm, the maximum power on the disk: 45 mW) as follows: Immediately after production of disk U, its reflectivity was as low as 18 percent, so laser beam equivalent to 17 mW was used to wholly initialize the disk surface. Then the reflectivity was shown to have risen from 18 to 72 percent. Then the disk was rotated at a specified speed, and continuous beam coming from the semiconductor laser was kept at the low power level without recording in a desired radial position. Beam was concentrated by the objective lens having a numerical aperture of 0.55 in the optical head, and was emitted to recording layer 11 through substrate 9. When the reflected beam was detected, the optical head was driven so that the center of the optical spot would agree with the intermediate position between two grooves. Recording and tracking the intermediate position between two grooves avoided noise generated from the grooves. While tracking in this way, automatic focus alignment was conducted to ensure that the focus would be located on the recording layer, and recording and erasing were conducted simultaneously by overwriting with one beam. When recording by crystallization on the track (intermediate position between grooves), the laser power suitable for crystallization should be as high as crystallization takes place, and should be lower than that when conversion into amorphous state takes place. When conversion into amorphous state is used for erasing, the laser power suitable for conversion into amorphous state is higher than that for crystallization and is lower than that when substantial deformation occurs or holes are made. Overwriting by one beam was conducted by changing laser power between the intermediate power level causing crystallization and high power level causing conversion into amorphous state. Power ratio between high power level causing conversion into amorphous state and the intermediate power level causing crystallization is particular preferred to be from 1 : 0.4 to 1 : 0.8. After passing through the portion for recording, laser power was reduced to the read-out optical level where no change took place, and automatic focus alignment was continued. Tracking and automatic focus alignment were even during recording. This allows the recorded information to be replaced by the new information on the already recorded portion. In the first one rotation or several rotations at the time of record replacement, the record was exposed to the continuous beam with power closer to said laser power having higher modulation and was erased once. After that, the laser beam modulated between the higher power level and intermediate power level was emitted for recording according to the information signal in the next one rotation. This method minimizes the previously recorded information left unerased, and ensures a high carrier-to-noise ratio. In this case, effective rewriting was achieved when the power of the continuous beam to be emitted first was within the range from 0.8 to 1.1, where said high power level was assumed as 1.

Information was recorded by changing the laser power between intermediate power (on disk surface) by crystallization and high power level (on disk surface) by conversion into amorphous state at the disk U linear speed of 1.4 m/s and with read-out optical level of 1.0 mW. While tracking and automatic focus alignment were carried out on the track recorded in this way, continuous beam of 1.0 mW was emitted on the disk surface at the readout optical level without recording and erasing, and the intensity of this reflected beam was detected to reproduce the information. Here 11 T repeated signal (0.2 MHz, duty 50 percent) at 8–14 modulation (EFM) and 3 T repeated signal (0.72 MHz, duty 50 percent) were overwritten alternately, using the recording laser beam at the high power level of 30 mW and that at the intermediate power level of 16 mW. From medium reflectivity (Ro) of the unrecorded mark and information recorded mark (Rw), the readout signal modulation amplitude (Mod) at the information recorded mark can be defined as given in the following equation 1:

$$Mod\ (\%) = 100 \times |Ro - Rw|/Ro \ldots \quad (1)$$

Firstly, 11T repeated signal at EFM was recorded; then the reflectivity of the portion exposed to recording laser beam changed from 73 to 21 percent, and readout signal output having a carrier-to-noise ratio of 60 dB was obtained at the readout signal modulation amplitude of 71 percent and resolution band width of 10 kHz. When 3 T repeated signal at EFM was overwritten on it, the readout signal output with the carrier-to-noise ratio of 58 dB and the erasing ratio of the preceding signal (11 T signal) of 30 dB was obtained at the readout signal modulation amplitude of 61 percent and resolution band width of 10 Hz. The number of rewritings at this time was 1000 or more.

Said disk U has an excellent acidity resistance. When left at 60 degrees Celsius and relative humidity of 95 percent for 3000 hours, there was no change in the medium reflectivity or transmissivity with respect to laser beam. When the disk U where 3 T repeated signal at EFM was overwritten in advance at the linear speed of 1.4 m/s was left at 60° C. and relative humidity of 95 percent for 3000 hours, there was no change in the readout signal modulation amplitude or carrier-to-noise ratio for readout signal output.

When the Co content was changed in the reflective layer 13 with the composition of $Au_{97} Co_3$ in the disk U, and 11 T repeated signal at EFM was overwritten with the reflectivity of reflective layer 13 and linear speed at 1.4 m/s, the disk reflectivity, electric resistance rate at 298K, thermal conductivity at 298K and recording power (high power level) exhibited the following changes:

| Co content (at %) | Reflectivity (%) | Electric resistance ($\mu\Omega \cdot cm$) | Thermal conductivity (W/m·K) | Recording power (mW) |
|---|---|---|---|---|
| 0 | 98 | 3 | 245 | Recording not possible at 45 mW |
| 0.5 | 97.5 | 7 | 105 | 45 |
| 1 | 97 | 9 | 82 | 38 |
| 2 | 96 | 14 | 53 | 33 |
| 3 | 95 | 19 | 39 | 30 |
| 4 | 94 | 26 | 28 | 27 |
| 5 | 93 | 32 | 23 | 25 |
| 8 | 91 | 33 | 22 | 24.5 |
| 10 | 89 | 33 | 22 | 24 |
| 15 | 85 | 33 | 22 | 23 |
| 20 | 80 | 33 | 22 | 22 |

When Co content was below 0.5 atomic percent, electric resistance was below 7 $\mu\Omega$·cm at 298K; so thermal conductivity at 298K was over 105 W/m·K, and recording was not possible at 45 mW on the disk surface. When the Co content was over 15 at. percent, reflectivity was below 85 percent, and it was difficult for disk reflectivity to reach 65 percent or more. Furthermore, when the Co content was 1 to 8 at. percent inclusive, the reflectivity of the reflective layer was as high as 91 percent or more; therefore, disk reflectivity could be further raised. When the Co content was 2 to 5 at. percent inclusive, the disk reflectivity was high and the electric resistance was also as high as 14 $\mu\Omega$·cm; therefore, thermal conductivity was as low as 53 W/m·K, showing excellent recording sensitivity and erasing sensitivity. The same result was obtained by replacing part or whole of the Co by one of the elements Al, Si, Sc, Ti, V, Cr, Mn, Fe, Ni, Zn, Ga, Ge, Y, Zr, Nb, Mo, Ru, Rh, Pd, Cd, In, Sn, Sb, Te, La, Hf, Ta, W, Re, Os, Ir, Pt, T1, Pb and Bi. Of said added elements, Co gave better recording and erasing sensitivity than other elements. Addition of Pd provided good acidity resistance of the reflective layer. Addition of Ti gave smaller crystalline grain size of the reflective layer, hence lower noise. Addition of Mo provided excellent close contact of the reflective layer, and the erasing ratio of the rewritable type was great. Addition of Ni resulted in weaker adhesive force of the reflective layer than that of other elements, causing the number of rewritings to be restricted for the rewritable type. Addition of Cr resulted in slightly greater undulations on the reflective layer surface than that of other elements, giving slightly greater disk noise.

Regarding reflective layer 13 with the composition of $Au_{97} Co_3$ in the disk U, we used the reflective layer 13 with the composition of $(Au)_{100-y} (Ag)_y$ or $(Au)_{100-y} (Cu)_y$ (where "y" denotes atomic percent, and $15 \leq y \leq 85$) instead of $Au_{97} Co_3$; the results were the same.

When the reflective layer 5 with the composition of $Au_{97} Co_3$ in disk U had a film thickness of 20 to 500 nm inclusive, the disk reflectivity was 65 percent or more, and recording was possible by the semiconductor laser. Since reflectivity could be raised and the recording sensitivity was excellent, the range from 30 to 300 nm inclusive was more preferable. The range from 40 to 150 nm inclusive was particularly preferable because reflectivity could be increased sufficiently and the recording sensitivity was sufficiently high.

By using the semiconductor laser with the wavelength of 830 nm, instead of the semiconductor laser with the wavelength of 780 nm in the optical disk drive, the same recording, erasing and reproduction characteristics could be obtained by a slight adjustment of the film thickness of each layer in the disk U except for the reflective layer 13. The information recorded and erased by the optical disk drive with the semiconductor laser having a wavelength of 780 nm was reproduced by the optical disk drive with the semiconductor laser having wavelengths of 680 and 630 nm. The result revealed that the same reproduction characteristics could be obtained by a slight adjustment of the film thickness of each layer in the disk U except for the reflective layer 13.

Regarding recording layer 11 with the major composition of Se and In in the disk U, we used the chalcogenide mainly composed of at least one element selected from among Sb, Sn, Te, Bi, Si, Ge, Pb and Ga instead of Se and In, and obtain the same result.

In said recording layer, addition of a small amount (10 at. percent or less) of such transition metal as Co, Pd, Ti, V, Cr, Mn, Fe, Ni, Cu, Ag or Au improved the stability of amorphous state.

Of the chalcogenides studied as said recording film, the chalcogenide containing the Se and In as major components permitted phase transition between the crystalline and amorphous states to be repeated several times under sufficiently stable conditions. Here addition of the elements Tl and transition metals such as Co, Pd by 3 to 10 percent further improved the erasing ratio during overwriting.

Of the chalcogenides studied as said recording film, the chalcogenide containing the Se and Sb as major components allowed the speed of crystallization to be increased during recording, while maintaining the stability of the amorphous state. This greatly enhanced the acidity resistance on the recording layer. Furthermore, addition of the element of $4b$ group such as Sn, Si, Ge and Pb further enhanced the stability of the amorphous state, and allowed the speed of crystallization to be increased during recording. This feature is suitable for the write-once type medium.

EMBODIMENT 22

The lower reflective layer 16 having a film thickness of 15 nm with the composition of $Au_{50} Ag_{50}$ in terms of atomic percentage was formed by radio frequency (rf) magnetron sputtering apparatus on the replica substrate 15, where 1.5 μm pitch spiral tracking grooves were formed on the surface of the disk shaped polycarbonate plate having a diameter of 120 mm and a thickness of 1.2 mm by injection molding. Then the lower dielectric layer 17 having a film thickness of 35 nm with the composition of $(ZnS)_{60} (SiO_2)_{40}$ in terms of atomic percentage was formed inside the same sputtering apparatus. Then the recording layer 18 with the composition of $Ge_{47} Te_{47} Sb_6$ in terms of atomic percentage was formed to have the film thickness of 20 nm inside the same sputtering apparatus. Then the upper dielectric layer 19 having a film thickness of 40 nm with the composition of $(ZnS)_{60} (SiO_2)_{40}$ in terms of atomic percentage was formed inside the same sputtering apparatus. Then the upper reflective layer 20 having a film thickness of 70 nm with the composition of $Au_{50} Ag_{50}$ in terms of atomic percentage was formed inside the same sputtering apparatus. Furthermore, ultraviolet light cured resin spin-coated was cured and the organic layer 21 having a film thickness of 50 μm was formed on said upper reflective layer 20.

Figure 5:
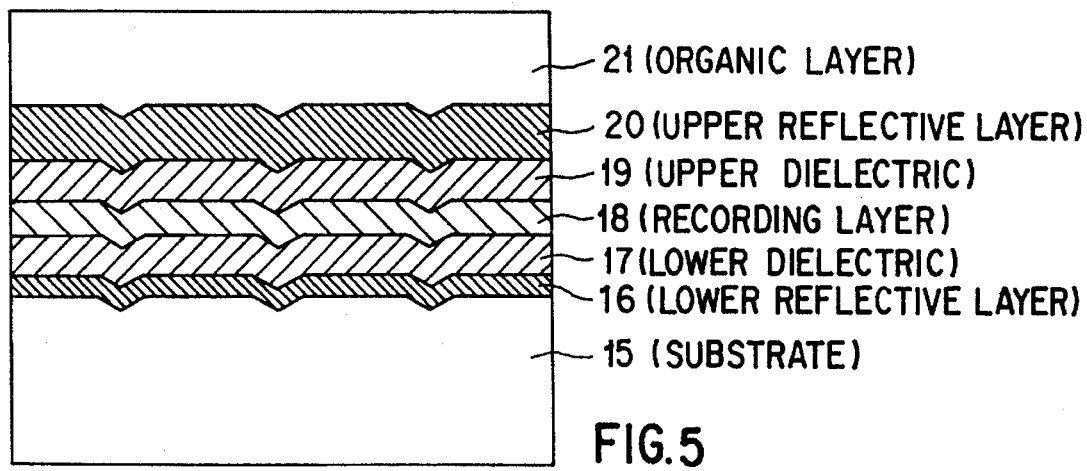
FIG. 5 is a sectional view illustrating the structure of the disk type the information recording medium according to further embodiment of the present invention.

FIG. 5 illustrates the sectional structure of the disk V prepared in said manner. In the FIG. 15 denotes the substrate, 16 the lower reflective layer, 17 the lower dielectric, 18 the recording layer, 19 the upper dielectric, 20 the upper reflective layer and 21 the organic layer.

The disk V prepared in said manner was used as a reversible disk, and recording, erasing and reproduction performance was evaluated in the same way as Embodiment 1 by using the laser disk drive (recording, erasing and reproduction devices), and by turning the disk at a specified linear speed. Immediately after production of disk V, its reflectivity was as low as 18 percent, so laser beam equivalent to 18 mW was used to wholly initialize the disk surface. Then the reflectivity was shown to have risen from 18 to 72 percent. With the linear speed of the disk V of 2.8 m/s and the readout optical level of 1.00 mW, the information was recorded by changing the laser power between intermediate power level (on the disk surface) by crystallization and high power level (on the disk surface) by conversion to amorphous state. The 11 T repeated signal (0.4 MHz, duty 50%) at EFM and 3 T repeated signal (1.44 MHz, duty 50%) were alternately overwritten using the recording laser beam at the high power level of 31.5 mW and that at the intermediate level of 17 mW. Firstly, 11 T repeated signal at EFM was recorded; then the reflectivity of the portion exposed to recording laser beam changed from 72 to 18 percent, and readout signal output having a carrier-to-noise ratio of 61 dB was obtained at the readout signal modulation amplitude of 75 percent and resolution band width of 10 kHz. When 3 T repeated signal at EFM was overwritten on it, the readout signal output with the carrier-to-noise ratio of 59 dB and the erasing ratio of the preceding signal (11 T signal) of 30 dB was obtained at the readout signal modulation amplitude of 61 percent and resolution band width of 10 Hz. The number of rewritings at this time was 1000 or more.

Said disk V has an excellent acidity resistance. When left at 60° C. and relative humidity of 95 percent for 3000 hours, there was no change in the medium reflectivity or transmissivity with respect to laser beam. When the disk U where 3 T repeated signal at EFM was overwritten in advance at the linear speed of 5.6 m/s was left at 60° C. and relative humidity of 95 percent for 3000 hours, there was no change in the readout signal modulation amplitude or carrier-to-noise ratio for readout signal output.

When the Ag content was changed in the lower reflective layer 16 and upper reflective layer 20 with the composition of $Au_{50} Ag_{50}$ in the disk V and 11 T repeated signal at EFM was overwritten with the reflectivity of upper reflective layer 20 and linear speed at 1.4 m/s, the disk reflectivity, electric resistance rate at 298K, thermal conductivity at 298K and recording power (high power level) exhibited the following changes:

| Ag content (at %) | Reflectivity (%) | Electric resistance (μΩ·cm) | Thermal conductivity (W/m·K) | Recording power (mW) |
| --- | --- | --- | --- | --- |
| 10 | 97 | 5 | 147 | Recording not possible at 45 mW |
| 15 | 97 | 7 | 105 | 45 |
| 20 | 96.5 | 9 | 82 | 38 |
| 30 | 96.5 | 14 | 53 | 33 |
| 40 | 96 | 15.5 | 47 | 32 |
| 50 | 96 | 16 | 46 | 31.5 |
| 60 | 96 | 15.5 | 47 | 32 |
| 70 | 96.5 | 14 | 53 | 33 |
| 80 | 96.5 | 9.5 | 77 | 37.5 |
| 85 | 97 | 7 | 105 | 45 |
| 90 | 97 | 4.5 | 163 | Recording not possible at 45 mw |

When Ag content was below 10 atomic percent and over 90 atom percent, electric resistance was below 7 μΩ·cm at 198K; so thermal conductivity at 298K was over 105 W/m·K, and recording was not possible at 45 mW on the disk surface. When the Ag content was 30 at. percent to 70 at. percent inclusive, disk reflectivity was high and the electric resistance was 14 μΩ·cm or more. So the thermal conductivity was as low as below 53 W/m·K, showing excellent recording sensitivity and erasing sensitivity.

In the lower reflective layer 16 and upper reflective layer 20 with the composition of $Au_{50}Ag_{50}$ in the disk, the same result was obtained by using the reflective layer with the composition of $(Au)_{100-x}(A)_x$ (where "x" denotes atomic percent, $0.5 \times \leq 15$), and the element represented by "A" is at least one element selected from among Al, Si, Sc, Ti, V, Cr, Mn,, Fe, Co, Ni. Zn, Ga, Ge, Y, Zr, Nb, Mo, Ru, Rh, Pd, Cd, In, Sn, Sb, Te, La, Hf, Ta, W, Re, Os, Ir, Pt, Tl, Pb and Bi), instead of $Au_{50}Ag_{50}$.

When the upper reflective layer 20 with the composition of $Au_{50}Ag_{50}$ in disk V had a film thickness of 20 to 500 nm inclusive, the disk reflectivity was 65 percent or more, and recording was possible by the semiconductor laser. Since reflectivity could be improved and the recording sensitivity was excellent, the range from 30 to 300 nm inclusive was more preferable. The range from 40 to 150 nm inclusive was particularly preferable because reflectivity could be increased sufficiently and the recording sensitivity was sufficiently high. Furthermore, when the film thickness of lower reflective layer 16 was 2 to 40 nm inclusive, the disk reflectivity was 65 percent or more, enabling recording by the semiconductor laser. Since reflectivity could be improved and the recording sensitivity was excellent, the range from 3 to 30 nm inclusive was more preferable. The range from 5 to 20 nm inclusive was particularly preferable because reflectivity could be increased sufficiently and the recording sensitivity was sufficiently high. The same result was also obtained when the lower reflective layer 16 and upper reflective layer 20 have different compositions if each film thickness was within said range.

By using the semiconductor laser with the wavelength of 830 nm, instead of the semiconductor laser with the wavelength of 780 nm in the optical disk drive, the same recording, erasing and reproduction characteristics could be obtained by a slight adjustment of the film thickness of each layer in the disk V except for upper reflective layer 20. The information recorded and erased by the optical disk drive with the semiconductor laser having a wavelength of 780 nm was reproduced by the optical disk drive with the semiconductor laser having wavelengths of 680 and 630 nm. The result revealed that the same reproduction characteristics could be obtained by a slight adjustment of the film thickness of each layer in the disk V except for the upper reflective layer 20.

Regarding recording layer 18 with the major composition of Te, Ge and Sb, we used the chalcogenide mainly composed of Te and Ge; or Te, In and Sb, instead of the Te, Ge and Sb, and obtain the same result. In said recording layer, addition of a small amount (10 at. percent or less) of such transition metal as Co, Pd, Ti, V, Cr, Mn, Fe, Ni, Cu, Ag or Au improved the stability of amorphous state.

In said disks U and V, the $ZnS$, $SiO_2$, $SiO$, $CeO_2$, $Al_2O_3$, $Ta_2O_5$, $Y_2O_3$, $ZrO_2$, $V_2O_5$, TaN, $Si_3N_4$, AlN and their mixture where the extinction coefficient which is the imaginary part of complex refractive index with respect to laser is 0.2 or less were used instead of the $(ZnS)-(SiO_2)$ system used for the dielectric layer; the same recording and erasing characteristics as those of disks U and V were obtained by controlling the film thickness according to each optical constant.

The same recording, erasing and reproduction characteristics were obtained by using the replica substrate having the ultraviolet light cured resin layer with tracking groove formed by photopolymerization on the surface of chemically reinforced glass plate, polycarbonate plate, polyolefin plate, epoxy plate and acrylic resin plate, in addition to the polycarbonate substrate and polyolefin substrate made by injection molding.

EMBODIMENT 23

As dye layer 23, phthalocyanine, one of the dyes, was spin-coated to a thickness of 70 nm on the replica substrate 22, where 1.5 μm pitch spiral tracking grooves were formed on the surface of the disk shaped polycarbonate plate having a diameter of 120 mm and a thickness of 1.2 mm by injection molding. Then the radio frequency (rf) magnetron sputtering apparatus was used to form the reflective layer 24 with the composition of $Au_{97}Co_3$ in terms of atomic percentage to have a film thickness of 50 nm. Then the ultraviolet light cured resin was cured spin-coated on said reflective layer 24 was cured to form the organic layer 25 having a thickness of 50 μm.

Figure 6:
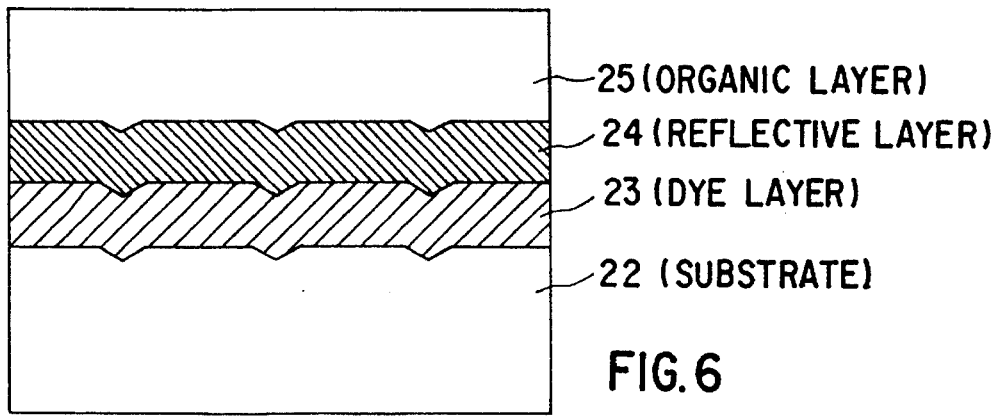
FIG. 6 is a sectional view illustrating the structure of the disk type the information recording medium according to still further embodiment of the present invention.

FIG. 6 illustrates the sectional structure of the disk W produced in said manner. In said disk W, 22 denotes the substrate, 23 the dye layer, 24 the reflective layer and 25 the organic layer.

The disk W produced in said manner was used as a rite-once type disk, and recording and reproduction performance was evaluated in the same way as Embodiment 1 by using the laser disk drive (recording and reproduction devices), and by turning the disk at a specified linear speed. Information was recorded by changing the laser power between the readout optical level and recording power level (on the disk) of 9 mW due to thermal deformation, with the linear speed of disk W of 5.6 m/s and the readout optical level of 1.0 mW. While tracking and automatic focus alignment were performed on the track recorded in said manner, continuous beam of 1.0 mW was emitted on the disk surface at the readout optical level without recording and erasing, and the intensity of this reflected beam was detected to reproduce the information. Here 11 T repeated signal (0.8 MHz, duty 50 percent) by EFM was recorded. The reflectivity of the portion exposed to recording laser beam changed from 71 to 24 percent, and readout signal output with carrier-to-noise ratio of 57 dB was obtained at the readout signal modulation amplitude of 67 percent and resolution band width of 10 kHz.

In the dye layer 15 comprising phthalocyanine of the disk W, the phthalocyanine was replaced by at least one of the dyes such as polymethine, naphtoquinone, rhodamine dye, cyanine dye, azurhenium dye, large-ring azaannulene dye and naphthoquinone-based dye, as major component, and the same result was obtained.

When the Co content of the reflective layer 16 of $Au_{97}CO_3$ in the disk W was changed, recording density was greatly reduced if the Co content was below 0.5 at. percent. When the Co content was over 15 at. percent, it was difficult for the reflectivity of the disk to exceed 65 percent. Furthermore, when the Co content was 1 to 8 at. percent inclusive, the reflectivity on the reflective layer was high and the disk reflectivity could be raised. When the Co content was 2 to 5 at. percent inclusive, the reflectivity and electric conductivity of the disk were high, so thermal conductivity was low, resulting in excellent recording sensitivity. The same result was obtained by replacing part or whole of the Co by at least one element selected from among Al, Si, Sc, Ti, V, Cr, Mn, Fe, Ni. Zn, Ga, Ge, Y, Zr, Nb, Mo, Ru, Rh, Pd, Cd, In, Sn, Sb, Te, La, Hf, Ta, W, Re, Os, Ir, Pt, Tl, Pb and Bi. Of said added elements, Co gave better recording sensitivity than other elements. Addition of Pd provided good acidity resistance of the reflective layer. Addition of Ti gave smaller crystalline grain size of the reflective layer, hence lower noise. Addition of Mo provided a close contact of the reflective layer and excellent resistance to environment.

Regarding reflective layer 24 with the composition of $Au_{97}Co_3$ in the disk W, we used the reflective layer with the composition of $(Au)_{100-y}(Ag)_y$ or $(Au)_{100-y}(Cu)_y$ (where "y" denotes atomic percent, $15 \leq y \leq 85$) instead of $Au_{97}Co_3$; the results were the same.

When the reflective layer 24 with the composition of $Au_{97}Co_3$ in disk W had a film thickness of 20 to 500 nm inclusive, the disk reflectivity was 65 percent or more, and recording was possible by the semiconductor laser. Since reflectivity could be raised and the recording sensitivity was excellent, the range from 30 to 300 nm inclusive was more preferable. The range from 40 to 150 nm inclusive was particularly preferable because reflectivity could be increased sufficiently and the recording sensitivity was sufficiently high.

The present invention provides an information recording medium having at least the recording and reflective layers to record information under exposure to recording laser beam, wherein the reflectivity of the medium with respect to reproduction laser beam coming from the substrate side is as high as 65 percent or more, —an information recording medium featuring excellent recording, erasing and reproduction characteristics, featuring long recorded data retention time, excellent resistance against environment and good recording and erasing sensitivity, thereby allowing use of economical low-output device to produce recording laser beam. The information recorded on the information recording medium of the present invention can be read by an inexpensive read only device such as a compact disc (CD), a laser disc or the like which have been already diffused widely.

What is claimed is:

1. In a rewritable information recording medium comprising at least a substrate, a recording layer deposited on said substrate directly or through a protective layer and comprising an inorganic substance whose optical constant changes due to reversible change of atomic arrangement when exposed to a laser beam virtually without deformation, an intermediate layer deposited on said recording layer, a reflective layer deposited on said recording reflective layer to reflect said laser beam, and a capping layer deposited on said reflective layer, wherein said rewritable information recording medium has a reflectivity, with respect to the laser beam coming from the substrate, of at least 65 percent on the unrecorded mark and not more than 45 percent on the recorded mark, or not more than 45 percent on the unrecorded mark and at least 65 percent on the recorded mark, and wherein the film thickness of said reflective layer is from 15 to 25 nm inclusive.

2. An information recording medium according to claim 1, wherein said reflective layer comprises material whose single layer has reflectivity of at least 70 percent when the thickness of said single layer is at least 50 nm.

3. An information recording medium according to claim 2, wherein said material is selected from the group consisting of Al, Au, Ag, Cu, Al alloy, Au alloy, Ag alloy and Cu alloy.

4. An information recording medium according to claim 1 wherein the thickness of said recording layer ranges from 50 to 120 nm inclusive.

5. An information recording medium according to claim 4, wherein the extinction coefficient of said recording layer which is the imaginary part of the complex refractive index with respect to a laser beam on either unrecorded or recorded mark is not more than 0.2.

6. An information recording medium according to claim 5, wherein said recording layer contains Se and/or S ranging from 40 to 90 atomic percent.

7. An information recording medium according to claim 6 wherein said recording layer contains Se and/or S, and at least one element selected from the group consisting of In, Sn, Te, Bi, Si, Pb and Ga.

8. Am information recording medium according to claim 6 wherein said recording layer contains Se and/or S, and at least one element selected from the group consisting of T1, Co, Ti, V, Cr, Mn, Fe, Ni, Cu, Pd, Ag and Au.

9. An information recording medium according to claim 6, wherein said recording layer contains Se and/or S, and T1 or Co by 2 to 10 atomic percent.

10. An information recording medium according to claim 6 wherein said recording layer contains Se and In, and at least one element selected from the group consisting of Sn, Te, Bi, Si, Pb, Ga, Sb and Ge.

11. An information recording medium according to claim 1 wherein said intermediate layer has a thickness from 10 to 200 nm inclusive.

12. An information recording medium according to claim 11, wherein the extinction coefficient of said intermediate layer which is the imaginary part of the complex refractive index with respect to a laser beam is not more than 0.2.

13. An information recording medium according to claim 1 wherein said capping layer has a thickness from 20 to 500 nm inclusive.

14. An information recording medium according to claim 13, wherein the extinction coefficient of said intermediate layer which is the imaginary part of the complex refractive index with respect to a laser beam is not more than 0.2.

15. In an information recording medium comprising at least a substrate, a recording layer deposited on said substrate directly or through a protective layer to record the information under exposure to a recording laser beam and a reflective layer deposited on said recording layer directly or through other protective layers, wherein said information recording medium has a reflectivity, a with respect to the laser beam coming from the substrate, of at least 65 percent on the unrecorded mark and not more than 45 percent on the recorded mark, or not more than 45 percent on the unrecorded mark and at least 65 percent on the recorded mark, while the reflectivity of said reflective layer, with respect to the reproduction laser beam is at least 85 percent and electric resistance at the temperature of 298K of said reflective layer is at least 7 $\mu\Omega\cdot cm$.

16. An information recording medium according to claim 15 wherein said recording layer comprises the material subjected to deformation under exposure to the said recording laser beam.

17. An information recording medium according to claim 15 or 16, wherein said recording layer contains organic dye.

18. An information recording medium according to claim 15 or 16, wherein the thickness of said reflective layer is from 20 to 500 nm.

19. An information recording medium according to claim 15 or 16, wherein, assuming "A" as at least an element selected from the group consisting of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, T1, Pb and Bi and $0.5 \leq x \leq 15$, the composition of the alloy constituting said reflective layer is represented by the general formula $Au_{100-x}A_x$.

20. An information recording medium according to claim 15 or 16, wherein, assuming "D" as at least an element selected from the group consisting of Ag and Cu, and $15 \leq y \leq 85$, the composition of the alloy constituting said reflective layer is represented by the general formula $Au_{100-y} D_y$.

21. An information recording medium comprising at least a substrate, a lower dielectric protective layer, a recording layer comprising an inorganic substance whose optical constant changes due to change of atomic arrangement when exposed to a laser beam without deformation, an upper dielectric protective layer and an upper reflective layer provided successively on said substrate;

wherein the reflectivity of the said medium with respect to the reproduction laser beam coming from the substrate side is at least 65 percent on the unrecorded mark and not more than 45 percent on the recorded mark, or not more than 45 percent on the unrecorded mark and at least 65 percent on the recorded mark; and wherein the reflectivity of said reflective layer with respect to the reproduction laser beam is at least 85 percent and electric resistance at the temperature of 298K of said reflective layer is at least 7 µΩ·cm.

22. An information recording medium according to claim 21, wherein said recording layer contains Se and/or Te ranging form 30 to 90 atomic percent.

23. An information recording medium according to claim 21 wherein the thickness of said reflective layer is from 20 to 500 nm inclusive.

24. An information recording medium according to claim 21 wherein, assuming "A" as at least an element selected from the group consisting of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb and Bi and $0.5 \leq x \leq 15$, the composition of the alloy constituting said reflective layer is represented by the general formula $Au_{100-x} A_x$.

25. An information recording medium according to claim 21 wherein, assuming "D" as at least an element selected from the group consisting of Ag and Cu, and $15 \leq y \leq 85$, the composition of the alloy constituting said reflective layer is represented by the general formula $Au_{100-y} D_y$.

26. An information recording medium comprising at least a substrate, a lower reflective layer, a lower dielectric protective layer, a recording layer comprising an inorganic substance whose optical constant changes due to change of atomic arrangement when exposed to a laser beam without deformation, an upper dielectric protective layer and an upper reflective layer provided successively on said substrate;

wherein the reflectivity of the said medium with respect to the reproduction laser beam coming from the substrate side is at least 65 percent on the unrecorded mark and not more than 45 percent on the recorded mark, or not more than 45 percent on the unrecorded mark and at least 65 percent on the recorded mark; and wherein the reflectivity of said reflective layer with respect to the reproduction laser beam is at least 85 percent and electric resistance at the temperature of 298K of said reflective layer is at least 7 µΩ·cm.

27. An information recording medium according to claim 26, wherein said recording layer contains Se and/or Te ranging from 30 to 90 atomic percent.

28. An information recording medium according to claim 26, wherein the thickness of said lower reflective layer is from 2 to 40 nm.

29. An information recording medium according to claim 26, wherein the thickness of said upper reflective layer is from 20 to 500 nm.

30. An information recording medium according to claim 26 wherein, assuming "A" as at least an element selected from the group consisting of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb and Bi and $0.5 \leq x \leq 15$, the composition of the alloy constituting said lower reflective layer and/or said upper reflective layer is represented by the general formula $Au_{100-x} A_x$.

31. An information recording medium according to claim 26 wherein, assuming "D" as at least an element selected from the group consisting of Ag and Cu, and $15 \leq y \leq 85$, the composition of the alloy constituting said lower reflective layer and/or said upper reflective layer is represented by the general formula $Au_{100-y} D_y$.

* * * * *